United States Patent
Yamane et al.

(10) Patent No.: US 7,983,837 B2
(45) Date of Patent: Jul. 19, 2011

(54) DISPLAY METHOD OF NAVI-SERVER AND NAVIGATION

(75) Inventors: Kenichiro Yamane, Tokyo (JP); Junsuke Fujiwara, Tokyo (JP); Yoshinori Endo, Zama (JP); Kimiyoshi Machii, Tokyo (JP); Shigeru Matsuo, Tokyo (JP); Hideo Hiroshige, Tokyo (JP); Takumi Fushiki, Tokyo (JP); Takayoshi Yokota, Tokyo (JP)

(73) Assignees: Hitachi, Ltd., Tokyo (JP); Xanavi Informatics Corporation, Zama-shi (JP)

( * ) Notice: Subject to any disclaimer, the term of this patent is extended or adjusted under 35 U.S.C. 154(b) by 434 days.

(21) Appl. No.: 10/753,408

(22) Filed: Jan. 9, 2004

(65) Prior Publication Data

US 2005/0043880 A1    Feb. 24, 2005

(30) Foreign Application Priority Data

Jan. 10, 2003    (JP) .................................. 2003-003832

(51) Int. Cl.
    *G01C 21/00*    (2006.01)
(52) U.S. Cl. ........ 701/200; 701/207; 701/210; 701/211; 701/212; 340/995.1; 340/995.13
(58) Field of Classification Search .................... 701/23, 701/200, 207, 208, 212, 214, 300, 211; 340/988, 340/990, 995.13, 995.1; 342/357.01, 357.08
See application file for complete search history.

(56) References Cited

U.S. PATENT DOCUMENTS

| 5,164,904 | A |   | 11/1992 | Sumner |
| 5,293,163 | A | * | 3/1994 | Kakihara et al. .......... 340/995.13 |
| 5,539,645 | A |   | 7/1996 | Mandhyan et al. |
| 5,739,773 | A |   | 4/1998 | Morimoto et al. |
| 5,874,905 | A | * | 2/1999 | Nanba et al. ................ 340/995.2 |
| 6,115,668 | A | * | 9/2000 | Kaneko et al. ................ 701/207 |
| 6,178,374 | B1 |   | 1/2001 | Moehlenkamp et al. |
| 6,259,377 | B1 |   | 7/2001 | Noccker et al. |
| 6,546,330 | B2 |   | 4/2003 | Fushiki et al. |
| 6,870,487 | B2 | * | 3/2005 | Nuesser et al. ............... 340/901 |
| 2002/0030611 | A1 |   | 3/2002 | Nuesser et al. |

FOREIGN PATENT DOCUMENTS

CN    1372230 A    2/2002

(Continued)

OTHER PUBLICATIONS

European Search Report dated Jan. 30, 2009.

(Continued)

*Primary Examiner* — Gertrude Arthur Jeanglaud
(74) *Attorney, Agent, or Firm* — Crowell & Moring LLP

(57) ABSTRACT

A navi-server which is provided with information from a traffic information providing center, and presents and provides information made on the information to a terminal is characterized by being equipped with a first storage means storing the information provided from the traffic information providing center; a traffic jam statistical making means which makes traffic jam statistical information including traffic jam information in a predetermined point and a predetermined zone as well as a reliability of the traffic jam information, based on information stored in the first storage means; and a second storage means storing information made by the traffic jam statistical making means, wherein the navi-server presents and provides the information stored in the second storage means to the terminal, based on a request of the terminal and at a predetermined timing.

5 Claims, 18 Drawing Sheets

FOREIGN PATENT DOCUMENTS

| | | |
|---|---|---|
| EP | 1235195 | 2/2002 |
| JP | 4-174894 A | 6/1992 |
| JP | 08-221687 | 8/1996 |
| JP | 8-263783 A | 10/1996 |
| JP | 09-113290 | 5/1997 |
| JP | 9-180094 A | 7/1997 |
| JP | 10-079094 | 3/1998 |
| JP | 11-281378 | 10/1999 |
| JP | 2000-235562 A | 8/2000 |
| JP | 2000-306190 A | 11/2000 |
| JP | 2001-124577 | 5/2001 |
| JP | 2002-090167 | 3/2002 |
| JP | 2002-162239 A | 6/2002 |
| JP | 2002-251698 A | 9/2002 |
| JP | 2002-260145 A | 9/2002 |
| JP | 2002-277265 A | 9/2002 |
| WO | 99/48073 A1 | 9/1999 |

OTHER PUBLICATIONS

European search report dated Jun. 29, 2009.
Japanese office action dated May 19, 2009.
Corresponding Japanese office action dated Nov. 24, 2009.
Corresponding Korean office action dated Jul. 29, 2010.

* cited by examiner

FIG. 9

| | | |
|---|---|---|
| Control Header Portion | Data Size | |
| | Data Number : n | |
| | Traffic Information Control Data : 1 | |
| | ⋮ | |
| | Traffic Information Control Data : n | |
| Traffic Information : 1 | Data Header Portion | Data Size |
| | | Mesh ID |
| | | Stored Data Kind |
| | | Control Data : 1 |
| | | ⋮ |
| | | Control Data : m |
| | Real-Time Traffic Jam Data | Link ID |
| | | Traffic Jam Information |
| | | Shape Data |
| | | ⋮ |
| | Traffic Jam Forecast Data | Link ID |
| | | Traffic Jam Trend Information |
| | | ⋮ |
| | Accident/Regulation Data | Point Coordinates |
| | | Link ID |
| | | Accident/Regulation Kind |
| | | ⋮ |
| | Traffic Jam Statistical Data | Point Coordinates |
| | | Link ID |
| | | Statisticall Time Zone |
| | | Traffic Jam Occurrence Frequency |
| | | Average Traffic Jam Degree |
| | | Data Reliability |
| | | ⋮ |
| | Parking Lot Data | Point Coordinates |
| | | Parking Lot ID |
| | | Parking Lot Situation |
| | | ⋮ |
| ⋮ | | |
| Traffic Information : n | | |

FIG. 16

| Point ID : 1 | Point Coordinates |
| | Data Number : $n_1$ |
| | Link ID : 1 |
| | ⋮ |
| | Link ID : $n_1$ |
| ⋮ | |
| Point ID : m | |

DISPLAY METHOD OF NAVI-SERVER AND NAVIGATION

BACKGROUND OF THE INVENTION

1. Field of the Invention

The present invention relates to a navigation system consisting of a server and in-vehicle terminal, and in particular, to a navi-server controlling traffic information and a navigation apparatus outputting the traffic information by making data communications with the navi-server

2. Description of the Prior Art

A conventional navigation apparatus notifies a driver of information such as a traffic jam and traffic regulation provided from a traffic information center through an FM multi-broadcast, electric waves/light beacons, and telephone networks by displaying the information in characters and simple graphics and displaying it overlapped on a map. Generally, the traffic information draws a traffic jam road and parallel line thereto beside a road, and represents a traffic jam degree by a color of the line and a traffic jam length by a length of the line. In addition, by performing a dynamic route search taking into consideration the traffic information and providing users with a shortest time route, the driver can know the traffic information centered on a position of his/her car and smoothly drive it.

Incidentally, the traffic information is information at a certain time in a near past, and therefore the driver cannot judge whether a traffic jam will be eliminated or aggravated more and more hereafter. Consequently, Japanese Patent Laid-Open Publication 2001-124577 has proposed a method for performing an animation display that shows whether a traffic jam will be improved or aggravated hereafter, and another method for displaying graphics showing an increase trend and decrease trend of the traffic jam on a map. For example, it is proposed to show a traffic jam extending trend by thickening a back end of an arrow mark and a traffic jam diminishing trend by thinning the back end of the arrow mark.

However, the conventional technology cannot judge whether provided traffic jam information is a traffic jam that frequently occurs or an abrupt one due to an accident and construction. In addition, if the information is a traffic jam that frequently occurs, it is difficult to judge how many hours it usually takes for the traffic jam to be eliminated.

Incidentally, it is difficult for a user to identify a traffic jam trend according to a slight difference of a graphic shape on a small display for use in an in-vehicle terminal. And such an animation display is not preferable from a viewpoint of eyes free since it captures driver's attention. Moreover, when displaying an extending/diminishing trend by deforming a graphic such as an arrow mark, a terminal cost increases since an exclusive graphics LSI and the like performing a graphics processing such as a texture mapping is needed.

SUMMARY OF THE INVENTION

A first object of the present invention is to provide a navigation system having means to notify a user of a point where a traffic jam frequently occurs, a road zone, further an occurrence time zone of the traffic jam, and the like.

In addition, a second object of the invention is to provide a navigation system clearly displaying a traffic jam point and the like in a simple display method.

A navi-server configuring the navigation system of the invention to achieve the objects is characterized by being equipped with a traffic jam statistical information making means that makes traffic jam statistical information configured of traffic jam information such as a traffic jam occurrence frequency and an average traffic jam degree in a predetermined point like an intersection or a road zone between intersections, and a reliability of the traffic jam information, based on stored past traffic information.

BRIEF DESCRIPTION OF THE DRAWINGS

FIG. 9 is a data configuration example of distributed traffic information;

FIG. 16 is a data configuration example of a point DB;

DESCRIPTION OF THE PREFERRED EMBODIMENTS

Figure 1:
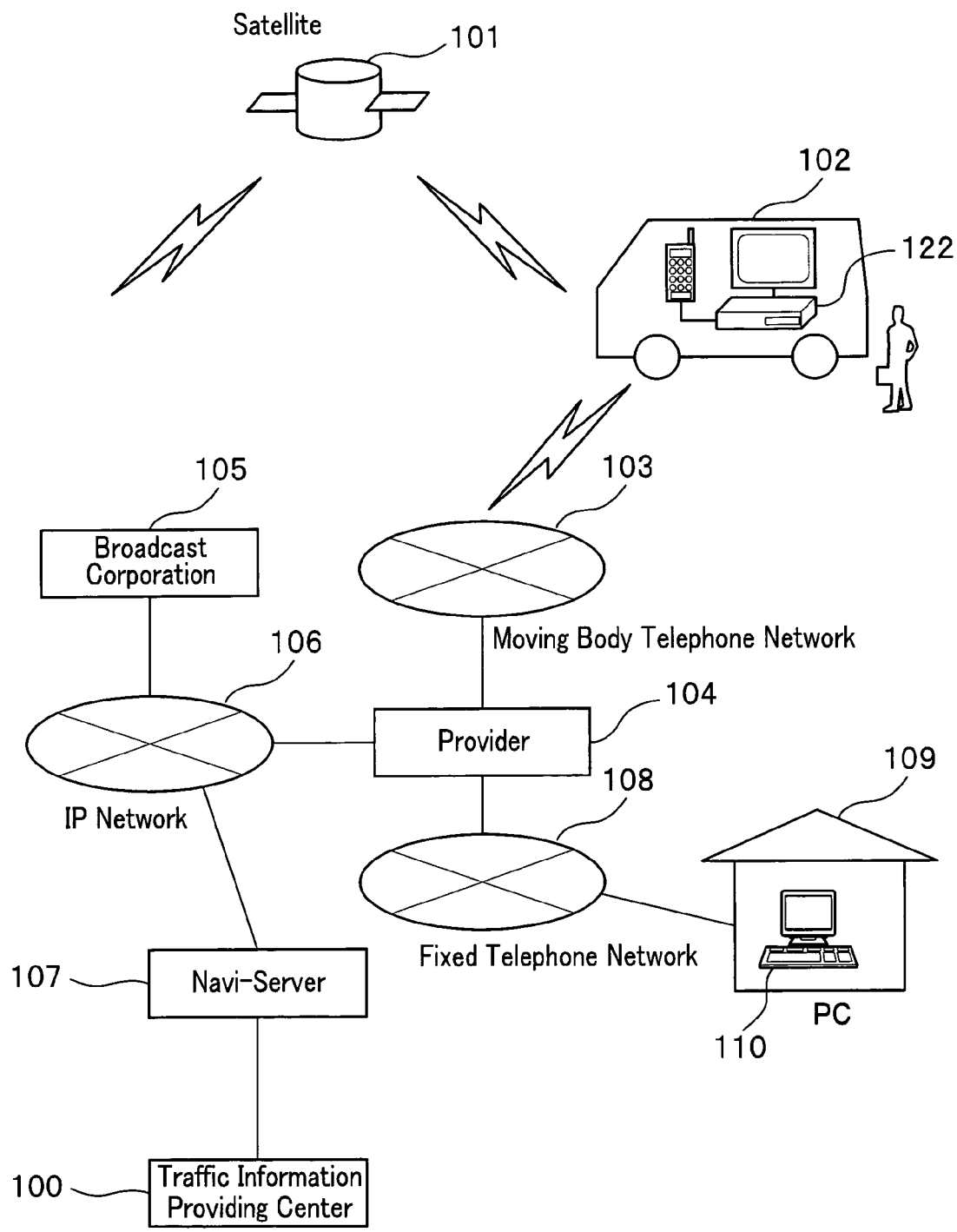
FIG. 1 is a general system drawing of a communications type navi.

Hereinafter, a navigation system using the present invention will be described in detail, referring to the drawings. FIG. 1 is a drawing showing a general configuration of the navigation system. The system consists of a satellite 101; a user's vehicle 102; a user's terminal 122; a moving body telephone network 103; a provider 104 performing a connection to the Internet; a broadcast corporation 105 receiving data sent from the satellite, and distributing the received data to users via an IP network 106; a navi-server 107 connected to the IP network 106 used for sending/receiving data that is distributed between the broadcast corporation 105 and provider 104; a fixed telephone network 108 to send/receive data through the IP network 106 or moving body telephone network 103 with being connected to the provider 104; a personal computer 110 at each user's home 109; VICS Center; and Japan Road Traffic Information Center (JARTIC), or a traffic information providing center 100 such as an ATIS that provides traffic information. Meanwhile, the user's vehicle 102 is not always to be a vehicle and may be a person (pedestrian) when the user's terminal 122 is a hand held terminal such as a cellular phone, a PHS, Bluetooth, a wireless LAN, or an ETC terminal, equipped with a wireless communications function.

Figure 2:
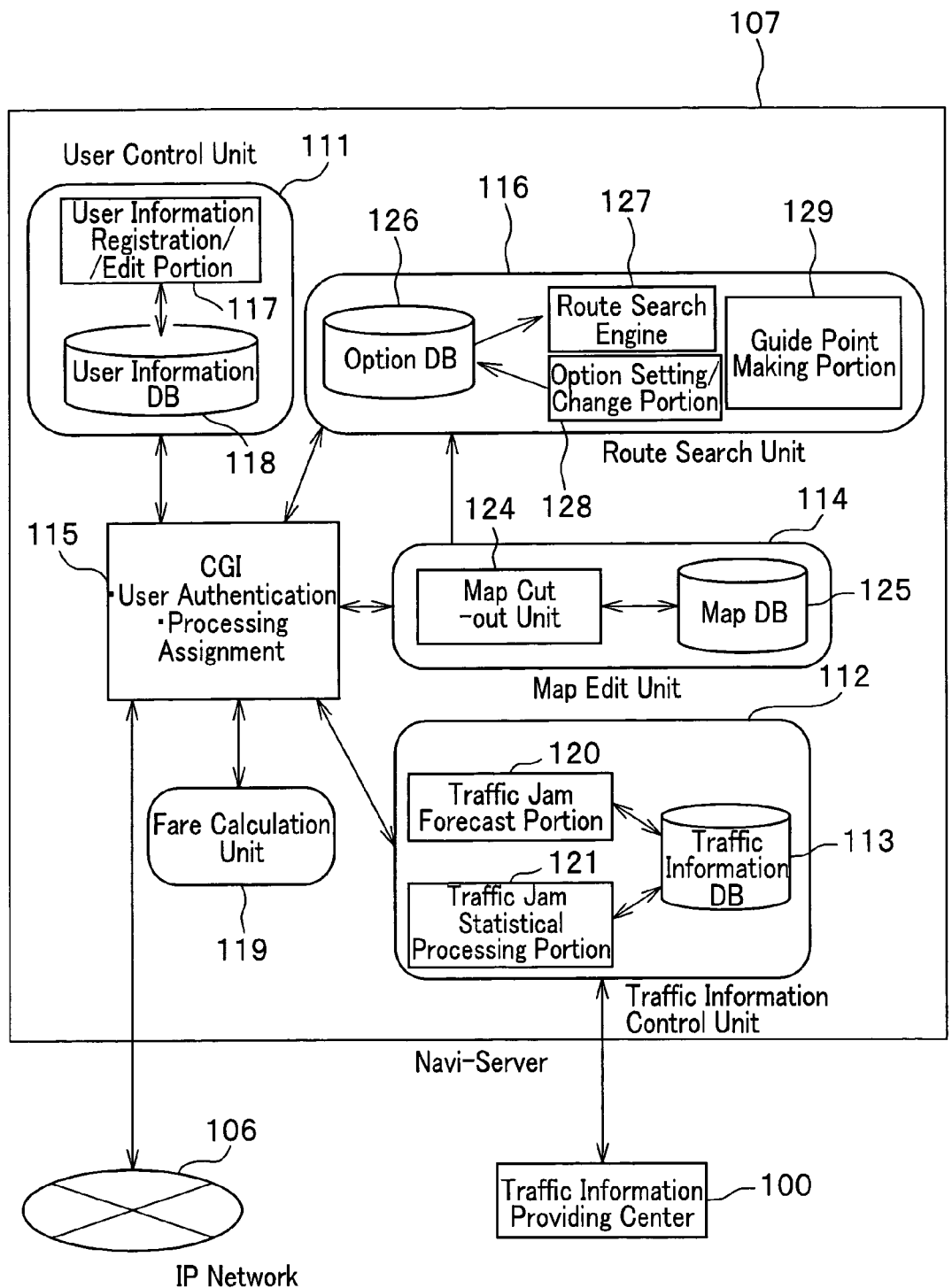
FIG. 2 is a configuration drawing of a navi information providing apparatus.

Next, a configuration of the navi-server 107 is described in FIG. 2. The navi-server 107 receives a latitude and longitude of a user's terminal in question, a moving speed of the user's terminal, its moving direction, a user ID number, an authentication password, an engine rotation number and other parameters representing vehicle conditions, that are sent from the user's terminal 122 mounted on the user's vehicle 102 through the IP network 106; and data relating to such a request service ID which the user desires. Then, after authenticating the user with a common gate interface (CGI) 115, the navi-server 107 sends the above sent data to any one of function units of a user control unit 111, a map edit unit 114, a route search unit 116, and a traffic information control unit 112 depending on a service requested by the user.

Out of data received by respective function units, information relating to the service in response to the user's request is sent to the user's terminal 122 of the user's vehicle 102 through the CGI 115, IP network 106, provider 104, and moving body telephone network 103 (hereinafter this route is called "communications network"). Or else when using a broadcast in sending the information relating the service, the information is sent to the user's terminal 122 through the CGI 115, IP network 106, broadcast corporation 105, and satellite 101 (hereinafter this route is called "broadcast network"). Or else when sending the information to the personal computer 110 at each user's home 109, a fixed telephone network is used and the information is sent to the personal computer 110 at each user's home 109 through the CGI 115, IP network 106, provider 104, and fixed telephone network 108.

Next, a configuration of each the function unit will be described.

The user control unit 111 is equipped with a user information database 118 and a user information registration/edit portion 117. When there exists a request for a user information registration/edit among data sent from a user, the unit 111 registers/edits relevant items checking the user information database 118 based on a relevant user ID The map edit unit 114 is configured of a map data base 125 and map cut-out portion 124. When a request for downloading a map data in a vicinity of a designated place such as a present place is sent from a user, the unit 114 sends the map data of a predetermined area including the designated place to him/her by reading it with the map cut-out portion 124 from the map data base 125. In addition, if when a route search unit 116 described later is called, map data on a search route is not downloaded to a terminal side, the map edit unit 114 is automatically called, cuts out the relevant area of the map data, and downloads it to a user side.

The route search unit 116 is configured of an option information database 126, a route search engine 127, an option information setting/changing portion 128, and a guide point making portion 129. After the user authentication by the CGI 115, in the unit 116 the option information setting/changing portion 128 sets/changes option information based on information of a departure place (present place) and a destination sent from the user or else a route point, and moreover based on the option information (for example, prevalently utilizing common roads/highways, being able to arrive in shortest time, and the like) if any; and then, the route search engine 127 computes a route from his/her car position to the destination using a route search method such as Dijkstra method. The guide point making portion 129 extracts a point indicating an intersection to turn right/left and a point to change a lane on the route obtained by the route search engine 127, reads simple graphics such as an enlarged intersection map and a lane at each extracted point, sound data for a guide, and the like from the option information database 126, thereby making guide point information.

The traffic information control unit 112 is configured of a traffic information DB 113 (traffic information database), a traffic jam forecast portion 120, and a traffic jam statistical processing portion 121. In the traffic information DB 113 the traffic information control unit 112 stores traffic information such as a traffic amount, a traffic jam, travel time, and accident/regulation information that is periodically sent from the traffic information providing center 100. In addition, traffic jam information and the like obtained from collected information (probe information) by a probe car may also be stored in the traffic information DB 113. Using the stored traffic information, the traffic jam statistical processing portion 121 computes the occurrence frequency of the traffic jam at an intersection and each road zone, thereby making traffic jam statistical data consisting of a traffic jam frequent occurrence point, its occurrence frequency, and the like. From stored traffic jam information and real-time one, the traffic jam forecast portion 120 makes forecast data (hereinafter called "traffic jam forecast data") relating to a traffic jam trend such as whether each traffic jam tends to be in an extending trend or in an extending trend hereafter or else a traffic jam situation does not change. And the traffic information control unit 112 stores the made traffic jam statistical data and traffic jam forecast data in the traffic information DB 113.

When a request for downloading traffic information in a vicinity of a designated place such as a present place from a user for the navi-server 107, the navi-server 107 reads real-time traffic information distributed from the traffic information providing center 100, traffic jam forecast data and traffic jam statistical data processed/made at the traffic information control unit 112 from the traffic information DB 113, and sends them to the user in response to his/her request. In addition, when traffic information on a route is requested, the navi-server 107 obtains the route data from the user control unit 111, extracts the traffic information (similar information to that in the vicinity of the designated place) on the route, and sends it to the user.

A fare calculation unit 119 is a portion where an accounting processing of a service fare for an in-vehicle terminal. The unit 119 has a function of an accounting for contents such as map data, route data, and traffic information data and another function of notifying respective in-vehicle terminals of communications fares by counting packets of communications data. Meanwhile, for a user contracting a monthly fixed fare for either a contents fare or a communications fare, it is not necessary to notify the in-vehicle terminal every time when he/she utilizes a service. Accordingly, it is acceptable to restrain notification around once per month in order to reduce a communications amount relating to the notification to the in-vehicle terminal or else not to perform the notification at all.

Figure 3:
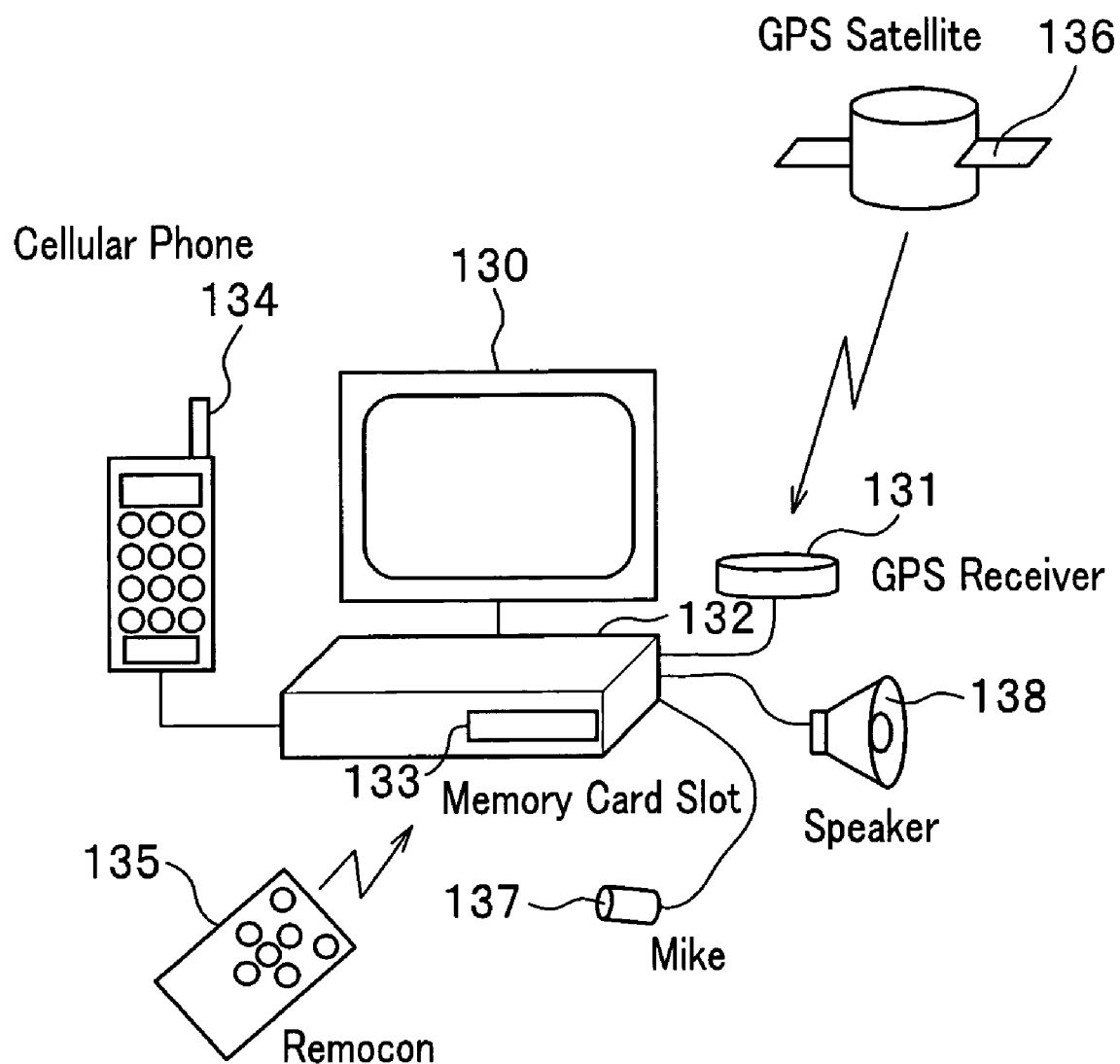
FIG. 3 is a configuration drawing of a navi-terminal.

In FIG. 3 a configuration of a car navigation (navi) terminal that is one example of the user's terminal 122 mounted on the user's vehicle 102 is described. The navi-terminal is equipped with a display apparatus 130, a GPS receiver 131, a cellular phone 134, a mike 137, and a speaker 138 connected to a main body 132, and the body 132 is equipped with a memory card slot 133. And the navi-terminal is equipped with a remocon 135 to operate the body 132.

The display apparatus 130 is a device that can display graphics such as a liquid crystal screen image. The GPS receiver 131 is an apparatus to receive a plurality of position measuring signals and to accurately calculate a terminal position. The main body 132 is an apparatus where a CPU, a memory, a power source, and a device for a graphics display.

The detail will be described later referring to FIG. 4. The cellular phone 134 is an apparatus to communicate with outside, that is, to send/receive data to/from the navi-server 107. The remocon 135 is an apparatus to transmit operation by a button which a user wants to perform. In addition, the mike 137 enables a command to be also sent by voice. The speaker 138 is a device to perform a voice output such as information received from the navi-server 107, a user assistance in operation of the navi, and a beep in attention/warning.

The memory card slot 133 is utilized to store received data from the navi-server 107 by connecting an external memory medium represented by a memory card using such as an involatile memory and small size hard disk, and to load information downloaded from the navi-server 107 in the past to the navi-terminal. The memory card slot 133 can be used only as a memory apparatus and also be used for a communications interface or an authentification of user information to receive a broadcast. For example, when a vehicle mounting the navi-terminal is a vehicle (and navi terminal) used by an unspecified number of users such as a rent-a-car, the user becomes able to utilize a service by inserting a memory card where authentication information is written into the memory card slot 133. That is, it becomes possible to charge an accounting on a terminal user not a terminal possessor when using other person's terminal, thereby a convenience being improved. Then if an upper limit of a money amount for which a service is received with the navi-terminal is set in a memory card, it also becomes possible to utilize the service matching with a user's budget. In addition, by downloading map data of a departure place to a memory card and the like in advance, also a labor hour for the user downloading the map data from the navi-server 107 in an initial state results in being omitted. Moreover, frequent information needed by him/her becomes able to be distributed by writing a service which the user utilized in the memory card, uploading it every constant period in the navi-server 107, and analyzing it with the navi-server.

Although in the configuration of FIG. 3 an example of the cellular phone 134 is exemplified as a telecommunications apparatus, to the main body 132 may be added as other telecommunications apparatuses: a PHS (Personal Handphone System), Bluetooth, a wireless LAN, or something with a wireless telecommunications function of such a DSRC (Dedicated Short Range Communication) terminal of an ETC and the like; or else broadcast electric waves from a satellite, broadcast electric waves that uses ground wave digital, a receiver that can receive broadcast electric waves using AM/FM electric waves, and an apparatus that decodes received data. In addition, instead of the GPS receiver 131 a position identifying service using the PHS and cellular phone may be used. In addition, although FIG. 3 shows the example of navi-terminals as one example of the user's terminal 122, particularly such the navi main body 132 and display apparatus 130 in the user's terminal 122 can also be substituted by terminals having a certain degree of display means such as a PDA, a note PC, and the cellular phone.

Figure 4:
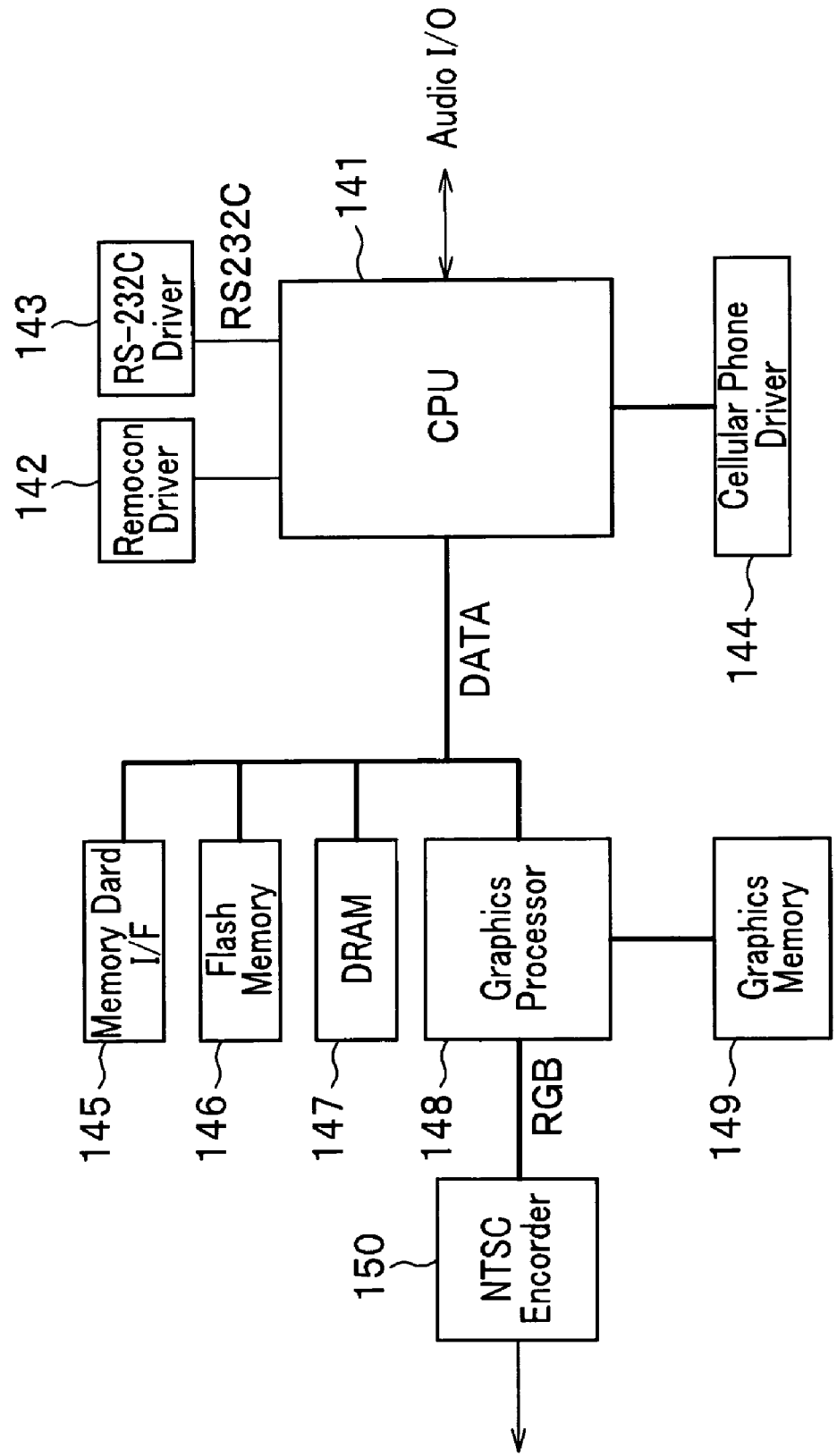
FIG. 4 is a hard configuration drawing of a navi-terminal.

FIG. 4 is a drawing showing one example of a hard configuration of the main body 132 in navi-terminals. The example is configured of a CPU 141, a remocon driver 142 that translates signals from the remocon 135, an RS-232C driver 143, a cellular phone driver 144, a memory card slot 133 and a memory card interface 145, a flash memory 146, a DRAM 147, a graphics processor 148, a graphics memory 149, and an NTS encoder 150. An audio input/output is used for an input from a mike 137 for a voice identification, and for a voice guide output to a speaker 138.

Although the configuration described above is a configuration in a case where data sending/receiving with the navi-server 107 is performed by communications, another configuration in a case of using broadcast media needs as described before an interface with an antenna to receive a broadcast, decoder, and the like. In addition, although an NTSC is typically used as signals to the display apparatus 130, a portion of the NTSC encoder 150 is naturally an encoder corresponding to a PAL system in an area where the PAL system is used for a broadcast or in a case where the display apparatus 130 corresponds to the PAL system.

Next, one example of a traffic information providing service by the navigation system is described. Firstly, by using the navigation system of FIG. 1 are described an example of downloading to the user's terminal 122 of the user's vehicle 102: real-time information such as traffic jam/travel time information, accident/regulation information, SA (Service Area)/PA (Parking Area) information, parking lot information, or various traffic jam information including processed information such as traffic jam forecast information and traffic jam statistical information.

When a user inputs a request of traffic information through an operation portion such as the remocon 135, the user's terminal 122 mounted on the vehicle 102 sends the download request of the traffic information to the navi-server 107 through the moving body telephone network 103, provider 104, and IP network 106. Here, other than the request data wanted to be downloaded, for example, the terminal 122 sends either designated position information such as a present position described with a latitude/longitude and the like or an area of which map data and traffic information is downloaded, and ID information and an IP address showing a position on the IP network of the navi-server 107. The terminal 122 sends these information to the provider 104 through the moving body telephone network 103.

The provider 104 identifies the IP address of the navi-server 107 designated by the user's terminal 122 from the information sent from it, and accesses the navi-server 107 through the IP network 106.

The navi-server 107 stores the traffic information sent from the traffic information providing center 100 (a plurality of centers may exist), analyzes traffic jam statistical information such as a traffic jam occurrence frequency of each road zone and intersection, and an average traffic jam degree; and a traffic jam change until then, and thereby makes traffic jam forecast information forecasting an increase/decrease trend of a traffic jam in a near future with a traffic jam statistical processing portion 121 and a traffic jam forecast portion 120, respectively, as needed. When the download request of the traffic information is sent from the user's terminal 122, from the traffic information DB 113 the navi-server 107 reads the real-time information such as the traffic jam/travel time information, accident/regulation information, SA (Service Area)/PA (Parking Area) information, and parking lot information within a data request area, or else the various traffic jam information including the processed information such as the traffic jam forecast information and traffic jam statistical information.

Next, the navi-server 107 sends the read traffic information to the broadcast corporation 105, the corporation 105 encodes the traffic information, and after packetizing, sends toward the satellite 101. After the user's terminal 122 mounted on the user's vehicle 102 receives data sent from the satellite 101, the terminal 122 outputs traffic information obtained by decoding the data to the display apparatus 130 and speaker 138.

Although the embodiment downloads the traffic information to the navi-terminal through the broadcast corporation 105, a next embodiment shows a method to obtain the traffic information by communications only. When a user requests a download of traffic information, other than request data wanted to be downloaded same as in the former embodiment, a navi-terminal sends a data request area, designated position information, a user ID, an IP address of the navi-server 107, and the like to the moving body telephone network 103, and sends the above data to the navi-server 107 through the provider 104 and IP network 106. Same as in the former embodiment, the navi-server 107 reads traffic information requested for a download. Then, giving the IP address information of the user's terminal 122 of the vehicle 102 to the read traffic information and dividing it into packets, the navi-server 107 sends them to the user's terminal 122 of the vehicle 102 through the IP network 106, provider 104, and moving body telephone network 103. And the user's terminal 122 outputs the received traffic information to the display apparatus 130 and speaker 138.

Meanwhile, information not needed to be frequently updated like the traffic jam statistical information may be stored in a memory medium such as a hard disk and a memory card in advance. When a user requests the download of information in question, with downloading the data from the navi-server 107, the information may be updated by overwriting stored data in the memory medium; or else it may be saved as other data. Thus the user's terminal 122 reads data in question from the memory medium as needed, thereby becoming able to output traffic information anytime without performing data communications.

Figure 5:
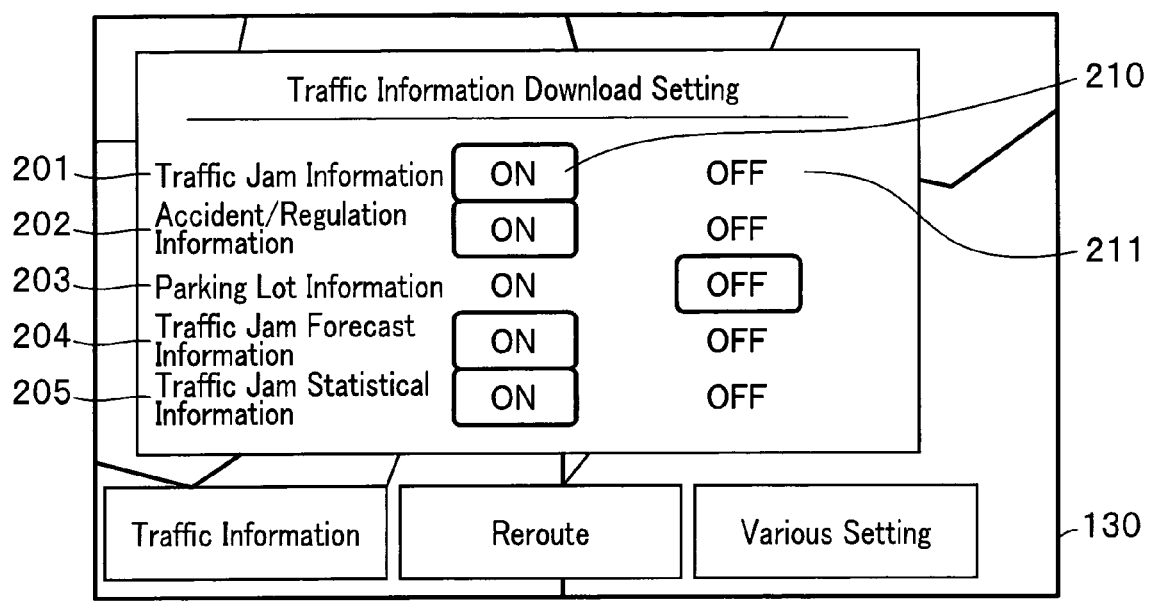
FIG. 5 is a screen image example of a traffic information download setting of a navi-terminal.

A download processing of the traffic information is described in detail as follows: FIG. 5 is one example of a screen image configuration in the user's terminal 122 where a user selects the traffic information which he/she wants to download. In the screen image, for each of a traffic jam information 201 showing a present traffic jam situation; an accident/regulation information 202 showing information such as no thoroughfare, a lane regulation, and an accident; a parking lot information 203 showing vacant/full information of parking lots, a traffic jam forecast information 204 showing whether the traffic jam of each road zone is in an extending trend or a diminishing trend; and a traffic jam statistical information 205 showing statistical information such as a traffic jam occurrence frequency and an average traffic jam degree, a user selects traffic information which he/she wants to download by operating a voice input through the remocon 135 and mike 137, or else an ON button 210 or an OFF button 21 disposed at a side of each item thorough an operation portion such as hard switches equipped with the navi main body 132 and display apparatus 130. In requesting a download of traffic information, the traffic information for which the ON button 210 is selected in the screen image is requested for the navi-server 107. For example, when the screen image is set as shown in FIG. 5, it results in requesting each traffic information relevant to the traffic jam information 201, accident/regulation information 202, traffic jam forecast information 204, and traffic jam statistical information 205 for the navi-server 107.

Figure 6:
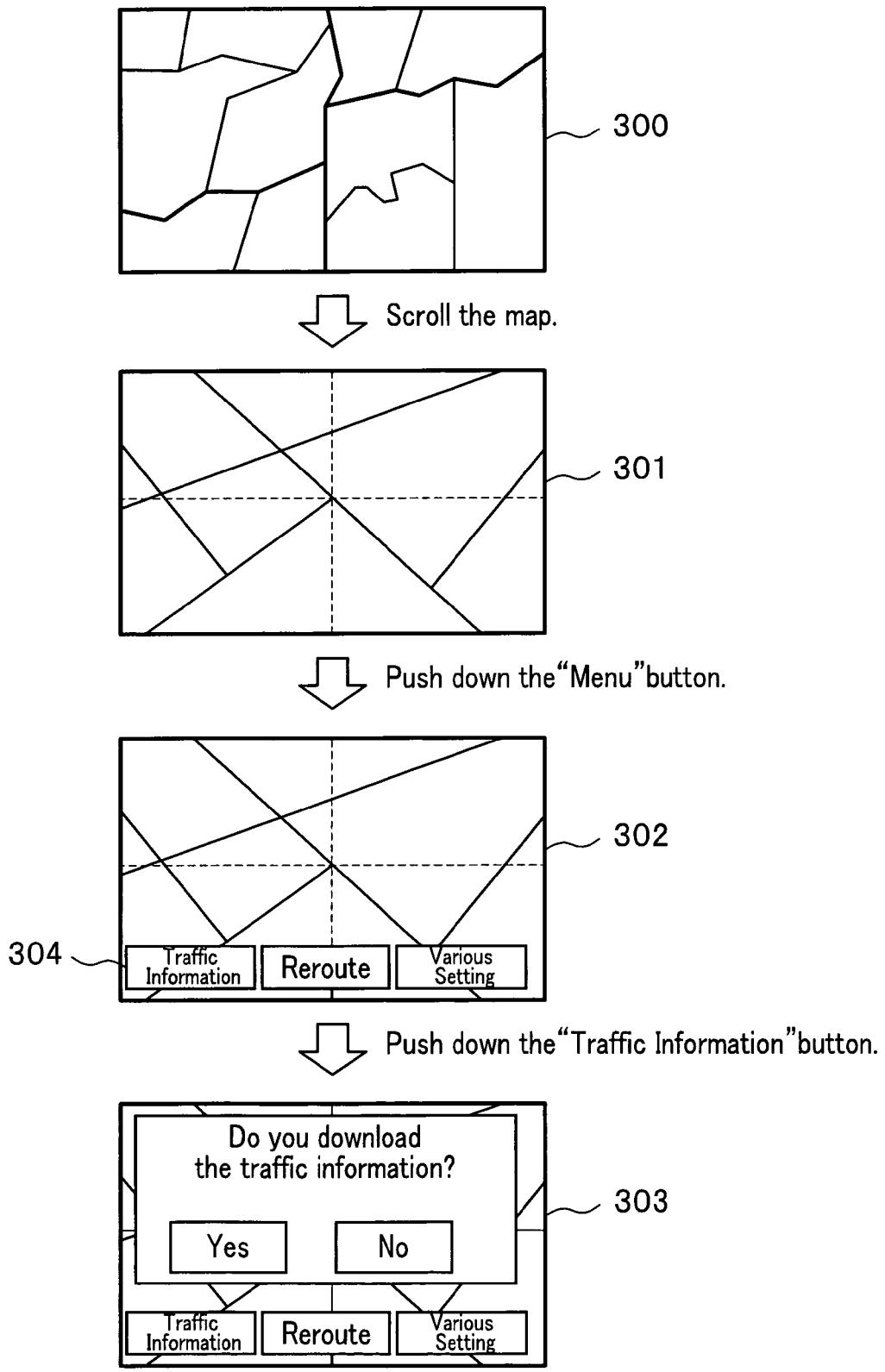
FIG. 6 is a screen image transition example of a traffic information download setting of a navi-terminal.
Figure 7:
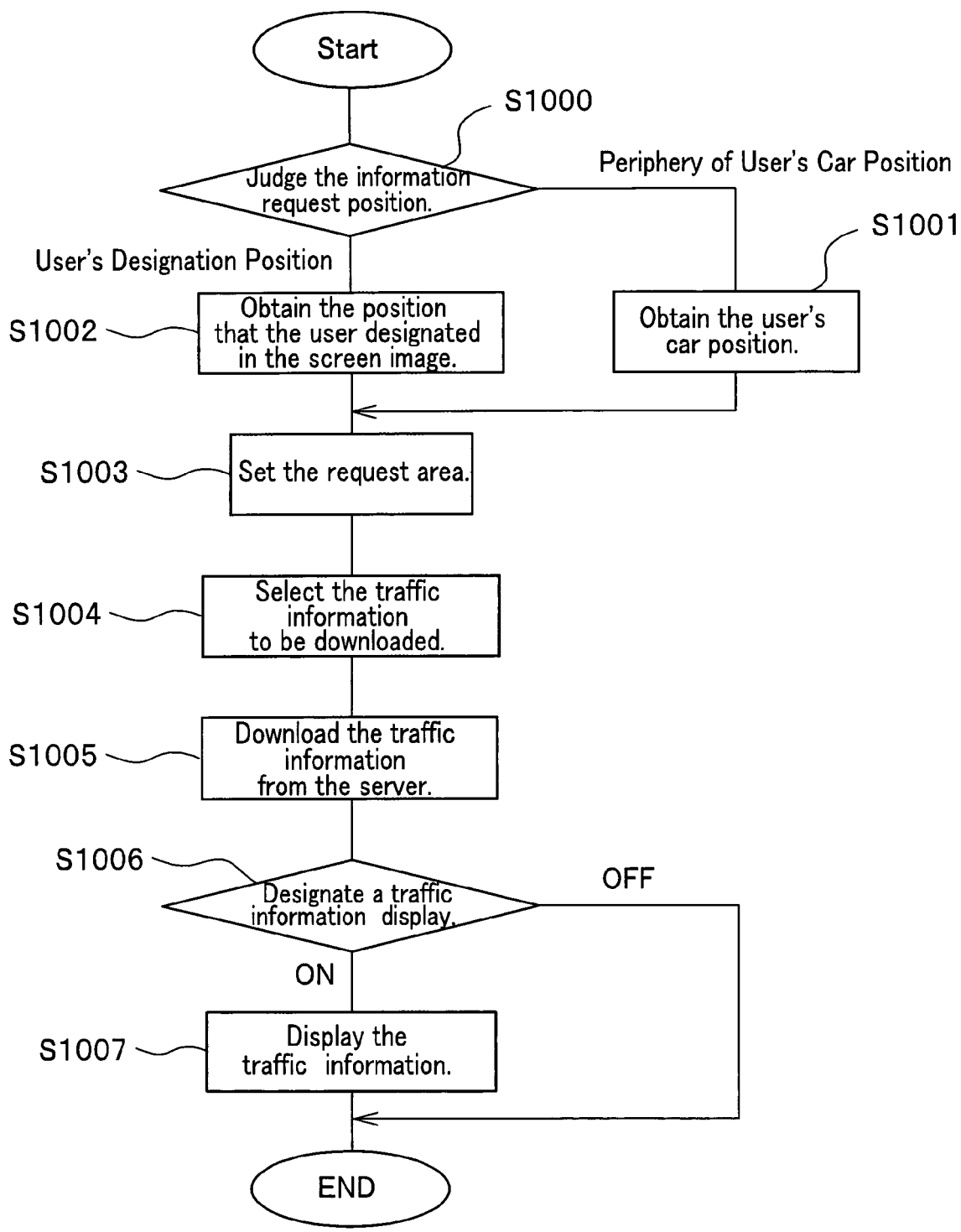
FIG. 7 is a processing flow of a traffic information download of a navi-terminal.

FIG. 6 is one example of a transition screen image where a user designates a position on a screen image and downloads traffic information in the periphery of the point. Firstly, the user scrolls (301) a map from a screen image 300 displaying a present position till a point of which traffic information he/she wants, through an operation portion such as a remocon. When reaching a destination, he/she displays a menu screen image 302 by pushing down a "Menu" button. Next, when he/she selects a traffic information button 304 in the menu, a menu screen image 303 confirming whether he/she downloads traffic information is displayed. When he/she selects the "Yes" button, downloading of the data of items set in advance with a traffic information download selection screen image like FIG. 5 starts. When he/she selects the "No" button, the menu screen image transits to the menu screen image 302. Meanwhile, when he/she wants to download traffic information in the periphery of the present point, it is possible to display the menu screen image 302 without scrolling (301) the map in a situation that the maps of the present point and its periphery are displayed, and to download the traffic information in the periphery of the present point by performing the operation described before, FIG. 7 is one example of a processing flow in a terminal when downloading traffic information. Firstly, in a request position decision of the traffic information, decide whether a download area is in a periphery of a present position or in a periphery of a point which a user sets a request position on a screen image (S1000). When the traffic information in the periphery of the present position is requested, obtain the latitude/longitude information of his/her car position by position detection means such as a GPS and a gyro (S1001). When the traffic information in the periphery of the point which he/she designated is requested, obtain a selected position on the screen image and convert it to the latitude/longitude information of his/her car position (S1002). And centering on the obtained latitude/longitude information, set a region of a rectangle size defined in advance as a data request area (S1003). Next, reading the kind of the traffic information selected in advance in the download setting screen image of the traffic information as shown in FIG. 5 out of a memory, set it a request data kind (S1004). Send the data request area and a traffic information request command including the request data kind to the navi-server 107 through a modem and the like. Receiving the traffic information for the traffic information request command sent from the navi-server 107, the user's terminal 122 stores the data in a memory medium such as a memory card and a hard disk, and disconnects a line (S1005). And when the terminal 122 is set so as to display the traffic information on the display apparatus 130 (S1006), it reads downloaded traffic information from the memory medium and displays stored traffic information overlapped on a map (S1007). Meanwhile, when a route to a destination is set and a route guide screen image for the route (for example, a simple graphic and a schematic map such as a deformation map) is displayed, the user's terminal 122 may display not only the traffic information on the map but also the downloaded traffic information also in the route guide screen image.

Next, a processing flow in the traffic information control unit 112 is described. The unit performs a making processing of the traffic jam statistical information and traffic jam forecast information. Firstly, the making processing of the traffic jam statistical information is described according to a flowchart in FIG. 14.

The traffic information control unit 112 receives the traffic jam information of each link ID periodically sent from the traffic information providing center 100, and reads the traffic jam information in a designated period (for example, a past month from present and the like) out of the traffic jam information stored for a predetermined period (S1200). Here, since the traffic jam information from the traffic information providing center 100 that is original data used in making the traffic jam statistical information is thought to be mixed with abnormal values (anomalous values) due to a sensing abnormality of a vehicle sensor, a trouble, and the like, two steps of abnormal value detection/removal processings using a statistical technique shown next may be performed in order to make the traffic jam statistical information more accurate. A first abnormal value detection/removal processing assumes that the whole day data relating to a relevant ID link is abnormal (S1201) in link ID data showing a traffic jam over predetermined hours in a day (for example, not less than 20 hours including a night in 24 hours) since special situations are thought such as the trouble of the vehicle sensor and an event (for example, Tokyo Motor Show), and thereby the processing removes (S1202) the whole data of the relevant day not to use it for the making of the traffic jam statistical information. Next, a second abnormal value detection/removal processing is performed for remaining data for which the first abnormal value detection/removal processing is performed. The second abnormal value detection/removal processing compares between traffic jam information in a same time zone of a plurality of days, assumes that data with a large deviation is abnormal (S1203), and thereby removes (S1204) the data. For example, relating to a road of a certain link ID, when each traffic jam occurrence time per hour from 10 to 11 a.m. in five days of weekdays is 0, 15, 20, and 50 minutes, the processing removes the data of 0 and 50 minutes that are large in difference from the average value (21 minutes), assuming them to be abnormal. As another method for detecting data with the large deviation, a method of removing the largest and smallest class data of a predetermined ratio (for example, 10%) out of parametric data with no condition like a trim average method is also acceptable. After performing the two steps of the abnormal value detection/removal processings described above, the unit 112 makes the traffic jam statistical information by averaging remaining data (S1205). Perform the processings of the S1201 to S1205) for all links. And make the traffic jam statistical information of each link a format to distribute to a user's terminal, home PC, and the like, and moreover, perform a distribution format edit such as a division of the data per mesh described later (S1207).

Although the traffic jam statistical information is thus made, the information may be designed to be automatically made periodically, for example, once per month using a calendar/clock function of a navi-server; or else to be made by a navi-server operator inputting commands to make the information according to his/her necessity.

Here, the traffic jam statistical information is further concretely described.

In the distribution format edit processing of the S1207 is described a control segment where a control easiness of traffic information data in the navi-server 107 is taken into consideration, while citing an example. The processing controls traffic jam information data to be stored per region called a mesh that divides a land surface at an equal distance with a latitude/longitude, and makes the traffic jam statistical information for each the mesh. As a control method other than the mesh, controls as follows are acceptable: one control by each prefecture; each city, ward, town, village; each block number, and the like; or another control by a road kind such as each high way, national road, prefecture road, and the like; or still another control by a combination of the plurality of the above control lots.

Figure 15:
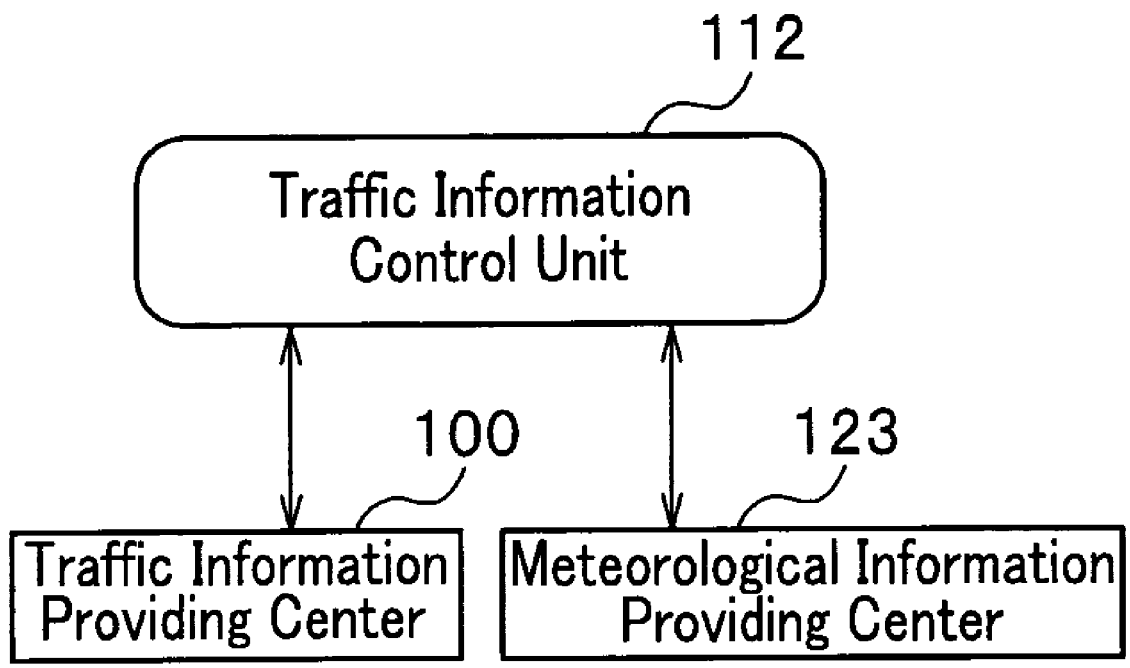
FIG. 15 is a configuration drawing of a navi traffic information providing system.

In the data read function of the designated period from the traffic information DB of the S1200, for example, store traffic information per each month and read indexes relating a traffic jam degree and a traffic jam frequency such as a summation of traffic jam occurrence time and a traffic jam length. Meanwhile, it is acceptable to make the traffic jam statistical information per each day of the week or per each weekday/Sunday/holiday by making read traffic jam information per each day of the week. In addition, for a period when a traffic situation is special such as a golden week and Bon holidays, a year end/year start, it is acceptable to make the traffic jam statistical information for each of them. Moreover, it is acceptable to make the above traffic jam statistical information taking into consideration a time zone such as a.m./p.m. or every hour. Still moreover, as shown in FIG. 15, it is acceptable to obtain information relating to a weather such as fine, rainy, and snowy; and road conditions such as dry, wet, and frozen from a meteorological information providing center 123, and to make the traffic jam statistical information taking into consideration the meteorological information.

In making the traffic jam statistical information of the S1205, a rank of a traffic jam occurrence frequency and the like depending on averaged traffic jam information (traffic jam occurrence time) may be classified. For example, classify it into three ranks: a traffic jam rank 1 (smooth) in a case that average traffic jam occurrence time in one hour is 0 to 10 minutes; a traffic jam rank 2 (crowded) in a case that the average traffic jam occurrence time in one hour is 10 to 30 minutes; and a traffic jam rank 3 (jammed) in a case that average traffic jam occurrence time in one hour is 30 to 60 minutes. In addition, for a link of which data is not obtained or else significant traffic jam information is not obtained because of much abnormal data, a traffic jam rank 0 (no obtaining of traffic jam statistical information) may be applied.

Figure 14:
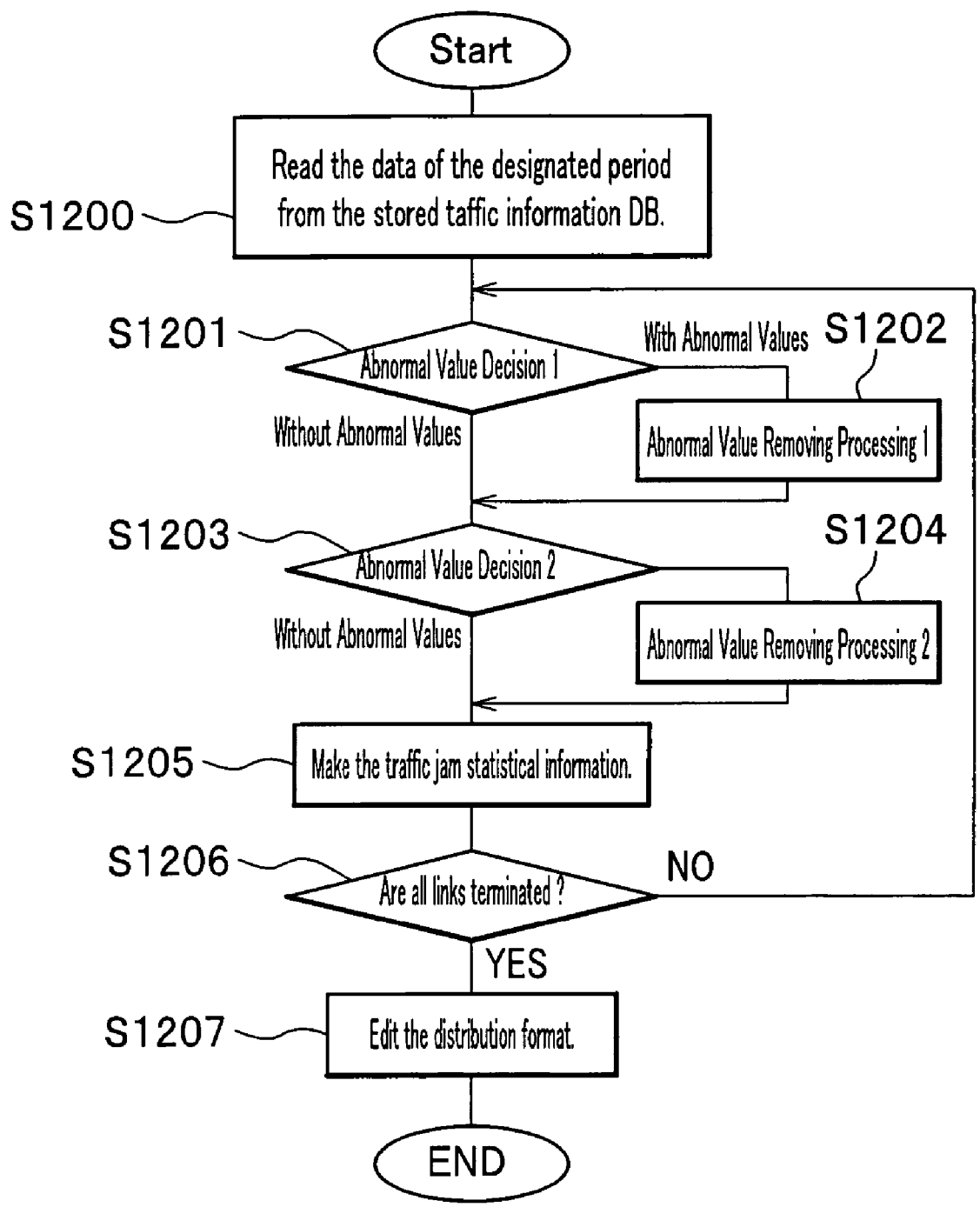
FIG. 14 is a processing flow for making traffic jam statistical information of a navi-server.
Figure 17:
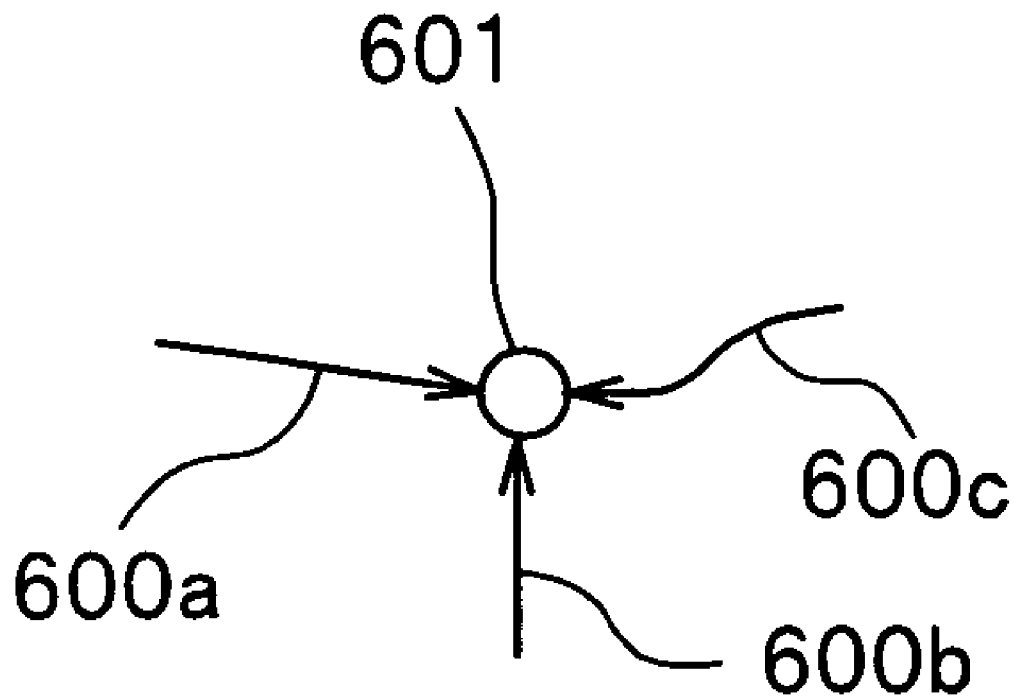
FIG. 17 is a concrete example representing a relationship between a point and link.

The example in the flowchart of FIG. 14 shows to make the traffic jam statistical information per link that is a road zone, and next, another example of making the traffic jam statistical information per point such as an intersection is described. A processing procedure is similar to the S1200 to S 1206 in the flowchart of FIG. 14, and after the termination of the processing of the S1206, a point edit processing (S1208) like next is added. The S1208 makes the traffic jam statistical information of a point from that of a link, based on a point DB made in advance such as FIG. 16. The point DB is made making a link 600 flowing in a point 601 an objective as shown in FIG. 17 (link flowing out of the point 601 is not made the objective), and consists of point coordinates, a configuring link number, and each configuring link ID. Then, in order to make the traffic jam statistical information of the point from that of the link, the S 1208 adopts maximum one out of average traffic jam occurrence time in each link ID by making all links that flow in the point the objective based on the point DB. Or make the traffic jam statistical information by adopting something showing a traffic jam potential as a point such as an average value of the average traffic jam occurrence time in each link ID. And make the traffic jam rank depending on the average traffic jam occurrence time of each point. The distribution format edit of the S1207 performs a similar processing to the distribution format edit per link described above.

Thus, the traffic jam statistical information per point can be made. As shown in FIG. 16, since the traffic jam statistical information per point is a consolidated one of the traffic jam statistical information of a link flowing in a relevant point, the information per point can reduce a data amount compared to that of the traffic jam statistical information per link unit and is also effective in improving a viewing identification by evading an untidy display when displayed on a wide area map. Since the information per point concretely means traffic jam information of each intersection, it becomes possible to easily grasp how much crowded/jammed situation each intersection is in.

Next, a making processing of the traffic jam forecast information is described. The processing stores/analyzes the changes of traffic jam indexes from before predetermined time till present (nearest past), and makes the traffic jam forecast information that is an increase/decrease trend of a traffic jam in a near future. For example, if an analyzed result of the changes of the traffic jam indexes is in an increase direction of the traffic jam, the processing judges that the traffic jam extends hereafter; if the analyzed result is in a decrease direction of the traffic jam, the processing judges that the traffic jam is in a diminishing direction. The judgment of the traffic jam trends may judge using traffic jam information only in the nearest past from before predetermined time till present, or may judge using statistically processed traffic jam statistical data such as data average values stored for a predetermined period such as one month in addition to the traffic jam information in the nearest past from before predetermined time till present. In addition, the traffic jam rank may be classified according to the largeness/smallness of change ratios of the traffic jam indexes in the analyzed result of the traffic jam indexes, and for example, is represented such as: large in a traffic jam increase trend, small in a traffic jam increase trend, large in a traffic jam decrease trend, and small in a traffic jam decrease trend. Thus, for present traffic jam information that provides only three ranks such as traffic jam, crowded, and smooth, it is easily turned out how a traffic jam in question changes hereafter, and thereby a user becomes able to more flexibly respond in selecting a driving route. For example, even in information that a road zone ahead 1 km of the driving route is in a same "traffic jam," when it is in a traffic jam decrease trend, the user can judge that the traffic jam will be eliminated when he/she reaches there even if he/she drives on the traffic jam road as it is without changing the route; and on the contrary, when it is in a traffic jam increase trend, he/she can evade an occurrence of the traffic jam by requesting the navi-server 107 to change the route.

Figure 8:
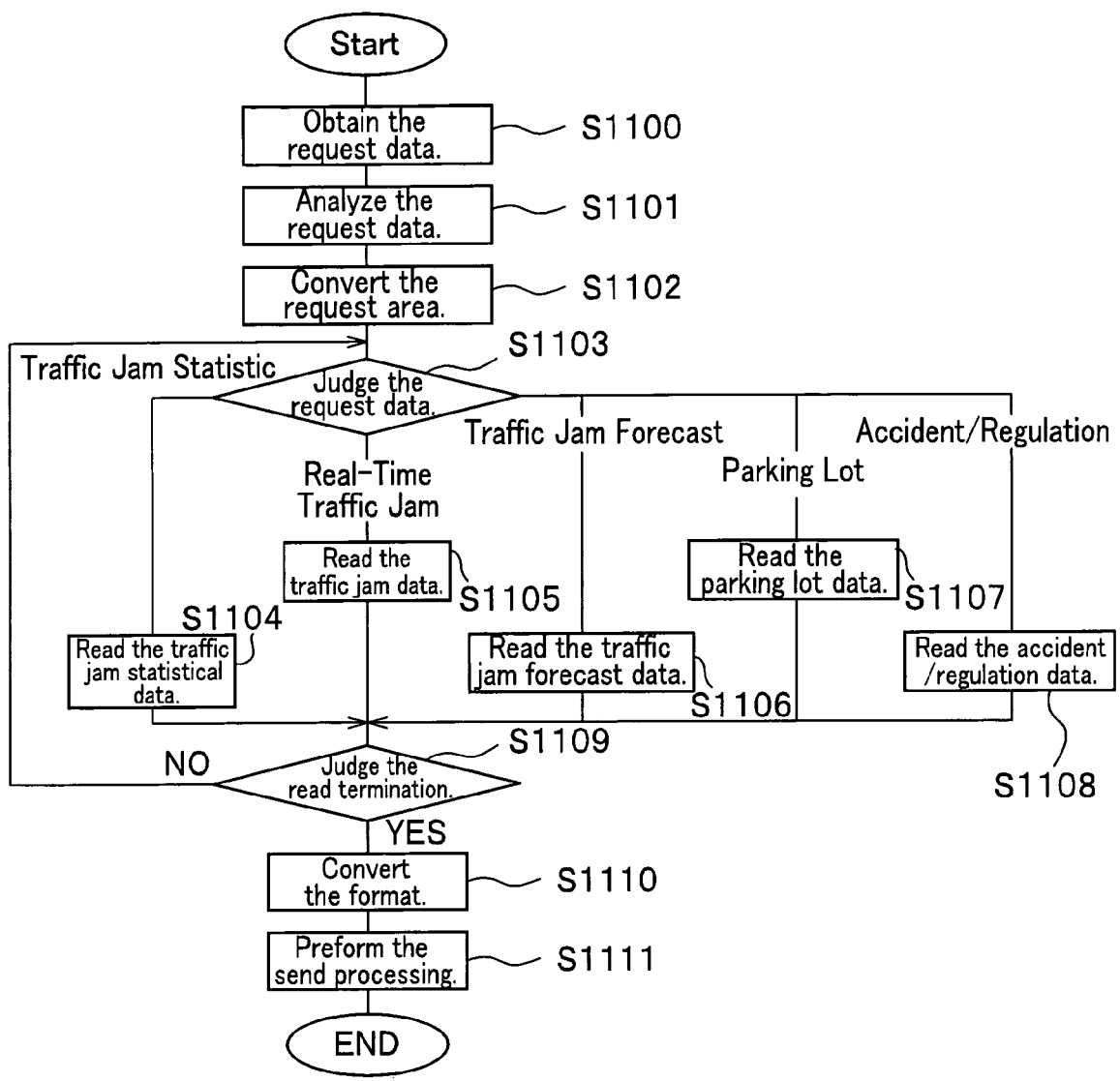
FIG. 8 is a processing flow of a traffic information download of a navi-server.

Next, in a case that a user requests a download of traffic information, a processing of the navi-server 107 is described. FIG. 8 is one example of a processing flow of the navi-server 107 in downloading the traffic information. After the CGI 115 performs a user authentication, the navi-server 107 sends data including a request command to the traffic information control unit 112. When the unit 112 receives the request command of the traffic information from a navi-terminal (S1100), the unit 112 analyzes the request command and extracts such a rectangle area where the traffic information should be downloaded out of the request command and a data kind to be downloaded (real-time traffic jam information, accident/regulation information, parking lot information, traffic jam statistical information, and traffic jam forecast information, and the like) (S1101).

A request area conversion S1102 searches out a mesh including the rectangle area and performs a processing to set the traffic information of a relevant mesh as a read objective. A request data decision S1103 decides a requested data kind and branches the data read processings (S1104-S1108) of the relevant data kind, and if the requested data kind is traffic jam statistics, traffic jam statistical data is read; if the requested data kind is real-time traffic jam information, the real-time traffic jam data is read; if the requested data kind is an accident/regulation, the accident/regulation information data is read; if the requested data kind is traffic jam forecast information, the traffic jam forecast information data is read; and if the requested data kind is a parking lot, the parking lot data is read.

A read termination decision S1109 decides whether or not the reading of all requested kinds of traffic information is terminated. When a plurality of data kinds of information are requested to be downloaded, the decision S1109 updates the data kinds to be downloaded and transits to the request data decision S1103. When all the traffic information is read, it is converted to a communications format type where header information such as each information kind and data size is added to the traffic information read with a format conversion S1110. A sending processing S1111 sends the traffic information already converted to the communications format type to the user's terminal 122 and home PC 110 through the CGI 115, IP network 106, and the like.

FIG. 9 is one example of a communications format relating to traffic information. A control header portion is traffic information control data configured of a total data size of communications data, a data number representing a sheet of mesh of an objective region included in the communications data, an offset from top data to data per each mesh, the data size described before, and the like.

The traffic information controlled per each mesh is configured of the data header portion and a data portion of data kinds requested for a download such as real-time traffic jam information data, traffic jam forecast data, accident/regulation data, traffic jam statistical data, parking lot data, and the like.

The data header portion is composed of control data consisting of a mesh ID that is a unique value added to each region where a land surface is divided at an equal distance with a latitude/longitude coordinate system, a storage data kind representing a data kind stored in the data, an offset of each data kind to a top data, a storage data number, a data size, and the like. In the real-time traffic jam information data, one traffic jam information is composed of a link ID that is a unique value within the mesh and is added per road zone, traffic information consisting of such a traffic jam degree and traffic jam length of a road zone for the link ID, and a road shape of a latitude/longitude for the link ID, and these are stored by a data number described in the control portion. The traffic jam forecast data is composed of a link ID, and traffic jam trend information representing whether a traffic jam is in an extending trend or in a diminishing trend, and these are stored by a data number described in the control portion. The accident/regulation data is composed of point coordinates of a latitude/longitude representing a place where an accident/regulation has occurred, an ID link representing a road zone where the accident/regulation has occurred, a kind of the accident/regulation such as a lane regulation and no thoroughfare, and an accident/regulation kind representing its causes, and these are stored by a data number described in the control portion. The traffic jam statistical data is composed of point coordinates of a latitude/longitude representing a place where a traffic jam frequently occurs or an ID link representing a road zone where the traffic jam frequently occurs, and information such as a statistical time zone representing such a season, month, day of the week, a.m./p.m., and a time zone when the traffic jam frequent occurrence point is effective; a traffic jam occurrence frequency representing the occurrence frequency of the traffic jam (or traffic jam rank); an average traffic jam degree representing an average traffic jam degree in a case of an occurrence of the traffic jam; and a data reliability, and these are stored by a data number described in the control portion. The parking lot data is composed of such a parking lot situation consisting of information such as the point coordinates of a latitude/longitude showing the place of a parking lot, a parking lot ID that is an identification code of the parking lot, a full/vacant situation and operation situation (open or closed) of the parking lot, and these are stored by a data number described in the control portion.

Figure 10A:
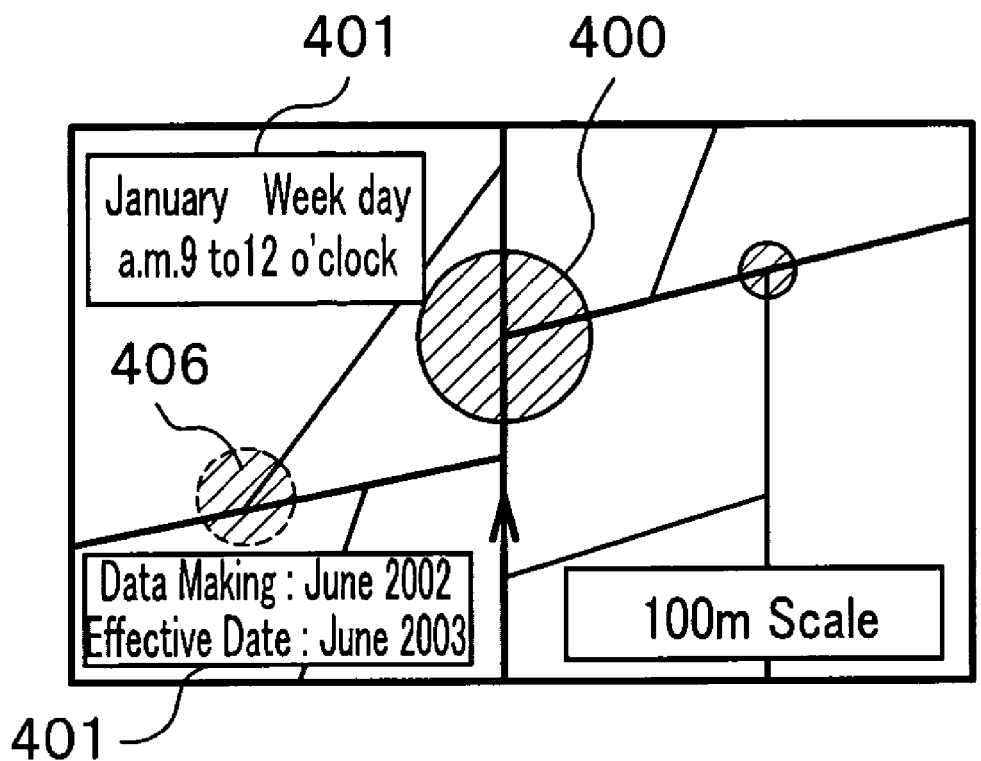
FIG. 10 is a display screen image example of traffic jam statistical information.
Figure 10B:
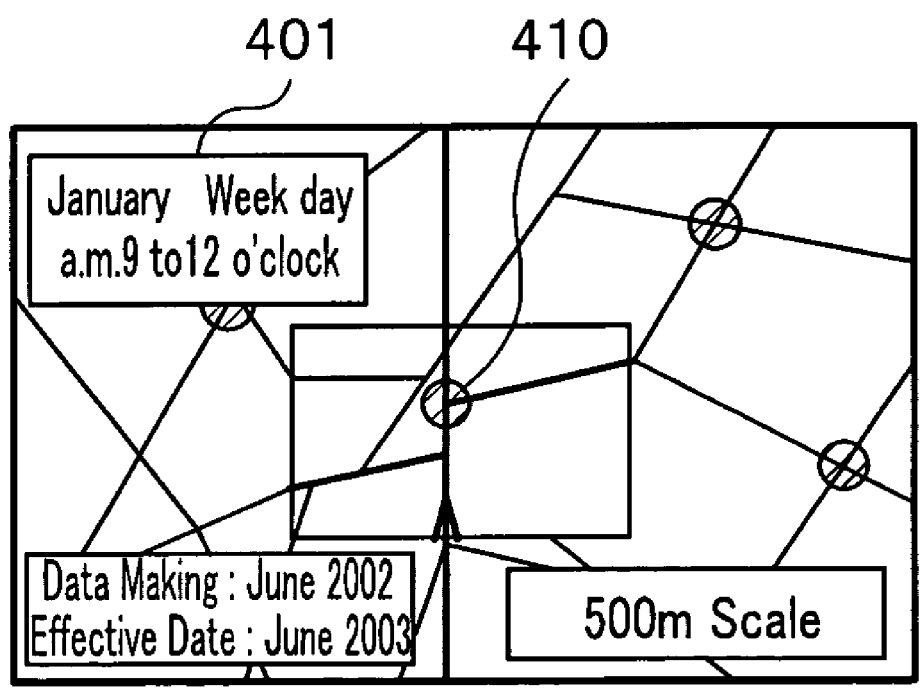

Next, FIGS. 10A and 10B show the display examples of the traffic jam statistical information in such a user's vehicle terminal and home PC. FIG. 10A shows that a circular graphic 400 representing a traffic jam frequent occurrence point and its degree is shown overlapped on a map by a circle with a radius depending on a traffic jam occurrence frequency, centering on the traffic jam frequent occurrence point. An effective time 401 displayed on an upper left of a screen image shows a date and hour and a time zone when the traffic jam statistical information shown overlapped on the map is effective. A data making time and effective date 404 shown on a lower left of the screen image displays a date and hour when the traffic jam statistical information is made, and a date when the traffic jam statistical information is effective. For example, the traffic jam statistical information displayed overlapped on the map with the effective time 401 is statistical information between 9 a.m. and 10 a.m. on a weekday of January, and shows its high effectiveness in the time zone. In addition, the data making and effective data 404 shows that the data is made in June 2002 and is effective till June 2003.

When a display scale is changed as shown in FIGS. 10A and 10B, the embodiment changes a display pattern of a traffic jam statistical information 400. For example, when the map is displayed enlarged (in detail) as in FIG. 10A, a grasp of the traffic jam degree is helped by changing the size of the circle according to the traffic jam occurrence frequency; when the map is displayed diminished (in a wide area) as in FIG. 10B, an identification of a traffic jam occurrence point is helped by displaying a traffic jam occurrence frequency 410 with a predetermined constant size of a circle. That is, in displaying the map being enlarged, the detailed information of the traffic jam degree in each intersection is provided; whereas in displaying the map being diminished, a display putting an emphasis on displaying an intersection where a traffic jam is occurring is performed since it gradually becomes difficult to grasp the traffic jam degree in the intersection. And when even a light degree of a traffic jam is displayed in a same size circle, a viewing identification of a map results in being lowered if anything, so a circle representing a traffic jam occurrence is displayed by restricting an intersection of which traffic jam is over a predetermined traffic jam degree. Meanwhile, a traffic jam degree that becomes an objective to be displayed may be changed according to a map scale, and in this case, the traffic jam degree that becomes a reference for each scale of a map, and a circle size in being displayed are defined. Moreover, information concerning whether the circle size is variable or fixed is defined by each scale of the map. By displaying a circle representing the traffic jam degree of an intersection on the map using these information, the traffic jam situation of the intersection can be represented without damaging the viewing identification of the map.

In the above example, although when changing the scale of the map to be displayed, the traffic jam degree to be displayed is selected by being parallelized with the intersection according to a largeness/smallness of the traffic jam degree, it is acceptable to select it based on a reliability of a traffic jam situation described later. In this case, by displaying a traffic jam situation on a map with restricting traffic information with over a constant value of a reliability, it is possible to grasp an outline with a high reliability relating to the traffic jam situation when displaying the map being diminished.

Although the embodiment shows an example where the circle size is selected according to the traffic jam occurrence frequency, the circle size may be determined according to an average traffic jam degree in a point in question. Or else a display changed depending on information (occurrence frequency or average traffic jam degree) relating to the traffic jam situation may be a circle color instead of the circle size, and their combination. Moreover, taking into consideration a data reliability in addition to the information relating to the traffic jam situation, a circumference portion of a displayed circle may be displayed in a solid line or a broken line. For example, a solid line 400 signifies that the data reliability is comparatively high; a broken line 406 signifies that the data reliability is comparatively low. Here, the data reliability corresponds to a repeatability of the traffic jam statistical information, and when the repeatability is high and a probability that the repeatability largely changes depending on a day is small, the reliability becomes high.

The reliability is determined by a variance (or standard deviation) of values such as traffic jam occurrence time in each day, an average traffic jam rank, or travel time. For example, for a road with a certain link ID, when each traffic jam occurrence time per hour from 10 a.m. to 11 a.m. for five days of weekdays is 0, 15, 20, 20, and 50 minutes, their standard deviation is 18.1659 minutes. By comparing it with a threshold, a plurality of classifications can be possible for the reliability. Examples of thresholds may be as follows: a standard deviation 0 to less than 10 minutes, a rank 1 (high reliability); a standard deviation 10 to less than 20 minutes, a rank 2 (middle reliability); a standard deviation not less than 20 minutes, a rank 3 (low reliability); and the like.

Meanwhile, a kind of line may be changed as a dotted line, a broken line, a dashed line, a chain double-dashed line, and the like depending on the reliability. In addition, when the traffic jam statistical information is provided for each time zone, the terminal may automatically select and display most effective traffic jam statistical information for such a present time zone by using a calendar which a terminal has, time data that is received from a GPS, and time data which a vehicle controls; or a user may display the traffic jam statistical information of a time zone different from such the present time zone depending on his/her preference by providing a means manually operating the effective time 401 of the traffic jam information.

In addition, although the embodiment displays the data making time and effective date 404 of the traffic jam statistical information with a character string, it is acceptable to notify a user that the data of the traffic jam statistical information is outdated by changing a plate color of the effective time 401 and a display color of the traffic jam frequent occurrence point 400 when a present date and hour passes the effective date. For example, when the traffic jam statistical information data is within the effective date, display the plate color of the effective time 401 in grey; when the data is out of the effective date, display the plate color of the effective time 401 in red. In addition, when the traffic jam statistical information data is within the effective date, display the traffic jam frequent occurrence point as described before; when a present date and hour passes an effective date, display the traffic jam frequent occurrence point so that the user knows that there exists a problem in a quality of information by changing/displaying a transmisivity, brightness, and tint of a graphic showing the traffic jam frequent occurrence point; making a graphic size small showing the traffic jam frequent occurrence point; and the like.

Incidentally, when there exists an area where the traffic jam statistical information is not provided, one area where the information is provided and the other area where the information is not provided may be displayed in different map-background colors. For example, draw one area where there exists no traffic jam statistical information, in a usual map-background color; and the other area where there exists the traffic jam statistical information, in a different color from the usual map-background color.

Figure 11A:
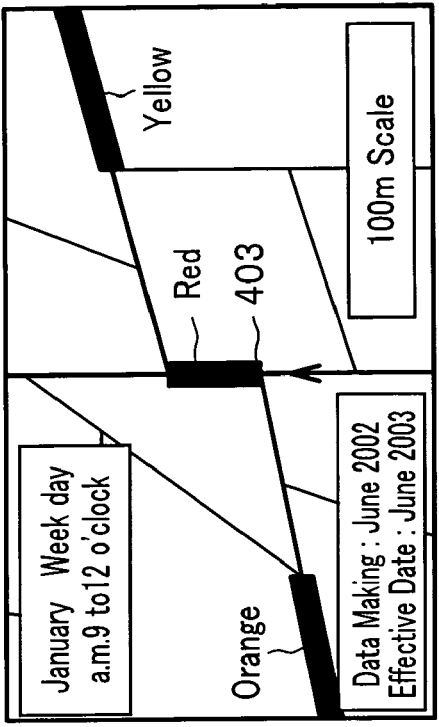
FIG. 11 is a display screen image example of traffic jam statistical information.
Figure 11B:
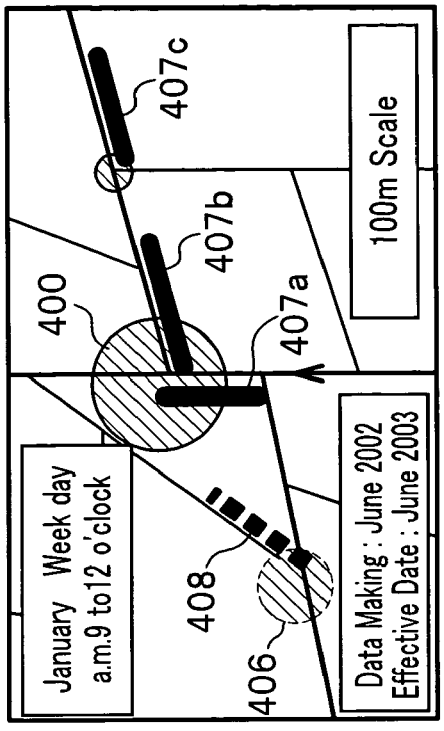
Figure 11C:
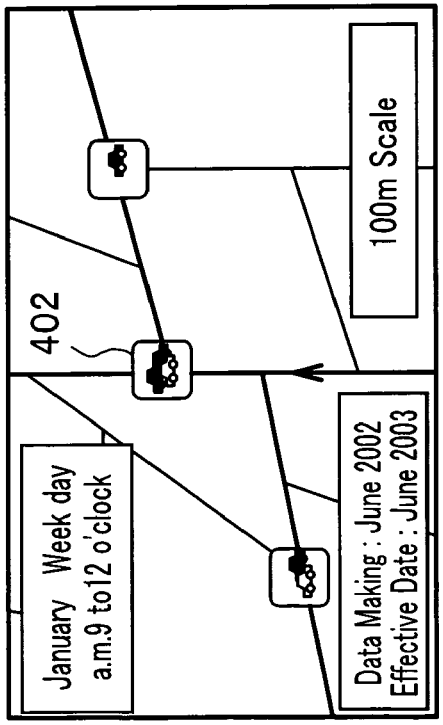

FIGS. 11A to 11D show other display examples of the traffic jam statistical information in a user's terminal and home PC. FIG. 11A matches the coordinates of a traffic jam frequent occurrence point at the center position of an image, selects an icon 402 according to a traffic jam occurrence frequency and the like, and thereby displays the traffic jam frequent occurrence point. FIG. 11B is an example displaying the traffic jam statistical information not in a point type of such an intersection but per zone (link). It is an example displaying a traffic jam zone in so called a cushion in a traffic jam frequent occurrence zone by drawing a bolder line on a back face of a road shape Firstly, draw background data such as sea, a river, and a green land, then selects line colors for roads of traffic jam frequent occurrence zones according to traffic jam occurrence frequencies, and draw them in lines bolder than those of the roads. In this case, a traffic jam zone 403 is drawn in red, a traffic jam zone 406 in yellow, and a traffic jam zone 408 in orange. After then, by drawing information such as roads and names being overlapped, a screen image like FIG. 11B is displayed. Meanwhile, when displaying a detailed map in combination with the display method of the traffic jam statistical information shown in FIGS. 10A, 10B, 11A, and 11B, it is acceptable to display the traffic jam occurrence frequency 400 in a circular shape; when displaying a wide area map, it is acceptable to display the icon 402 showing the traffic jam frequent occurrence 402. In addition, when displaying a detailed map with using the traffic jam statistical information per point in combination with the traffic jam statistical information per zone, is acceptable to display a traffic jam statistical information 403 per each road zone as shown in FIG. 11B; when displaying a wide area map, it is acceptable to display the icon 402 showing the traffic jam frequent occurrence point. Moreover, when a route 405 to a destination is set as shown in FIG. 11C, it is acceptable to extract and display a traffic jam statistical information 411 on the route 405. In addition, in displaying the traffic jam statistical information per zone, when a proceeding direction can be identified in a zone in question, it is acceptable to perform a drawing slightly displaced to a left side while being along a road instead of performing it in the bold line as in FIG. 11B.

Figure 11D:
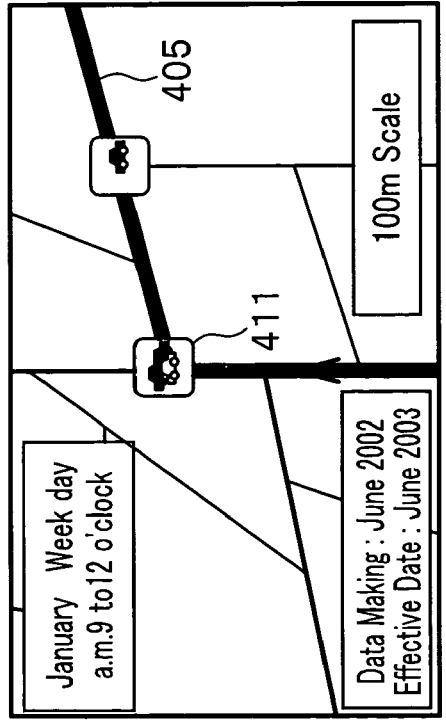

Still moreover, since a direction of a concrete traffic jam occurrence road is not known only with displays per point as in FIGS. 10A and 10B, it is acceptable to perform a combined display per point and per zone as in FIG. 11D or a display per zone only. A display pattern per link is especially effective in taking a general view of a traffic jam situation of a wide area road network since the display pattern per point corresponds to the traffic jam statistical information where a plurality of links are consolidated as shown in FIG. 16; the display pattern per link is especially effective in grasping a detailed traffic jam situation since the display pattern per link is detailed traffic jam statistical information classified according to proceeding directions. Accordingly, the display patterns may be automatically changed depending on a display scale of a map. In this case, same as in the example described before, by having information defining a presence or absence of a display per point and a display per zone for each displayed map scale or setting a lowest limit scale where both of the displays per point and per zone are performed, when performing a detailed display from the lowest limit scale, perform the displays per point and per zone; on the contrary when performing a wide area display from the lowest limit scale, perform a traffic jam situation display restricting the display per point.

FIG. 11D shows an example where each traffic jam statistical information of numbers 400, 406, 407, and 408 is displayed overlapped on a map where the numbers 400 and 406 are a per-intersection (point) and the numbers 407 and 408 are a per-zone (link) with a direction. In addition, for each described above, a color, length, line boldness, and the like may be classified depending on a traffic jam degree such as a traffic jam occurrence frequency. Moreover, as the number 407 is displayed in a solid line and the number 408 in a broken line, the displays may be changed depending on highness/lowness of the above data reliability.

Figure 18A:
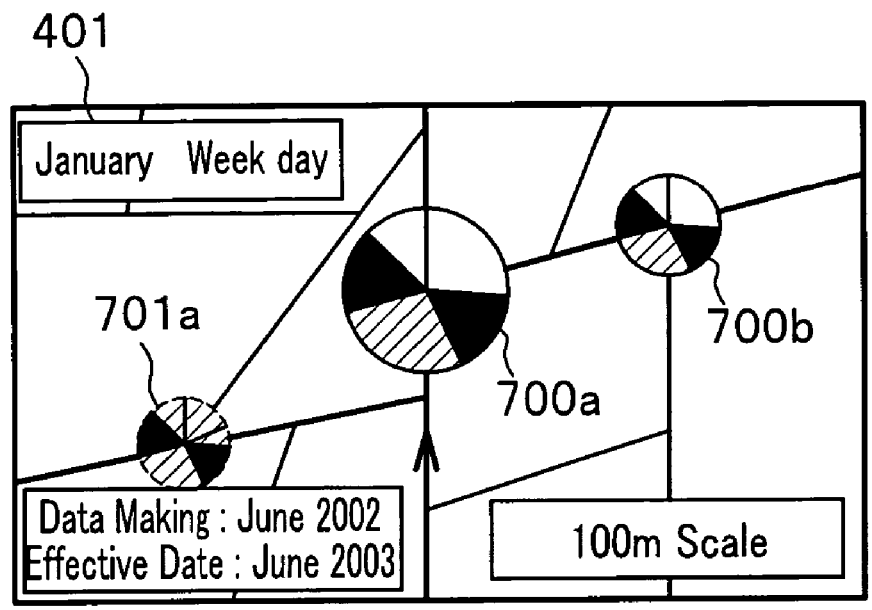
FIG. 18 is a display screen image example of traffic jam statistical information.
Figure 18B:
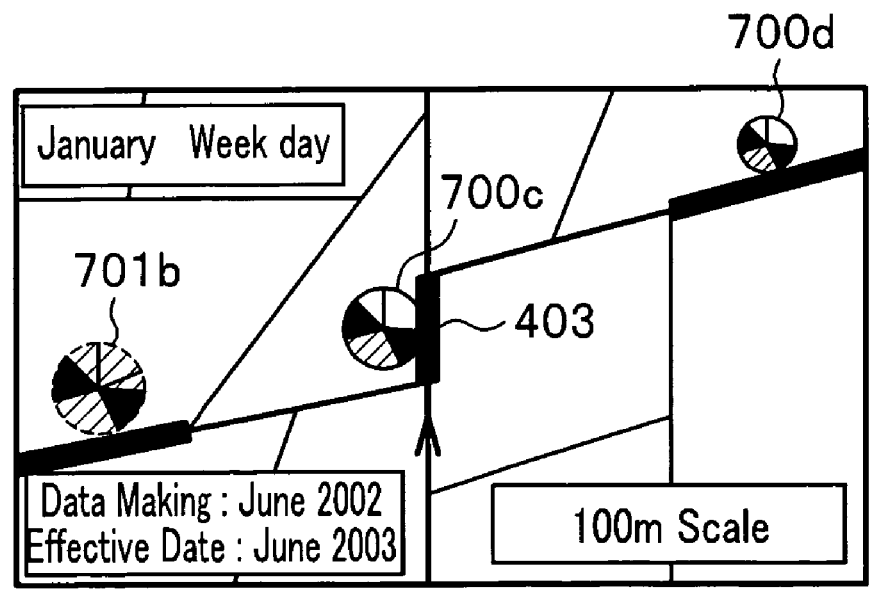

FIGS. 18A and 18B show still other display examples of the traffic jam statistical information in a user's terminal and home PC. FIG. 18A displays circular graphs 700 and 701 representing a traffic jam frequent occurrence point and its traffic jam occurrence frequency, or an average traffic jam degree and an occurrence time zone overlapped on maps by circles with radii depending on the traffic jam occurrence frequency, average traffic jam degree, and the like, centering on the traffic jam frequent occurrence point (intersection). Since there exist circular graphs representing occurrence time zones, there exists no description of a time zone as for an effective time 401 of the traffic jam statistical information. In the circular graphs a true north (true up) direction signifies 0 a.m., time zones relating to the traffic jam statistical information of 24 hours are clockwise inscribed per hour, and the traffic jam occurrence frequency of a corresponding time zone and the like are represented by colors of graphs. For example, an alpha numeral 700a of FIG. 18A signifies that: 0 to 6 o'clock (before 7 o'clock) is smooth; till 9 o'clock (before 10 o'clock), traffic jammed; till 16 o'clock (before 17 o'clock), crowded; till 20 o'clock (before 21 o'clock), traffic jammed; till 23 o'clock (before 24 o'clock), smooth. In addition FIG. 18B shows the positions of traffic jam frequent road zones (links), and moreover, shows circular graphs representing traffic jam degrees and occurrence time zones relating to each traffic jam frequent road zone overlapped in vicinities of relevant links on a map. Since a display pattern such as the former display pattern per point corresponds to the consolidated traffic jam statistical information of a plurality of links as shown in FIG. 16, it is especially effective in taking a general view of the traffic jam situation of the wide area road network; another display pattern such as the latter display pattern per link is the detailed traffic jam statistical information classified by each proceeding direction, it is especially effective in grasping the detailed traffic jam situation. Accordingly, the display patterns may be automatically changed depending on a display scale of a map. Meanwhile, in the drawings the circumference of the circular graph 700 is a solid line, whereas that of the circular graph 701 is a broken line. As already described, this represents the reliability of the traffic jam statistical information.

Figure 12A:
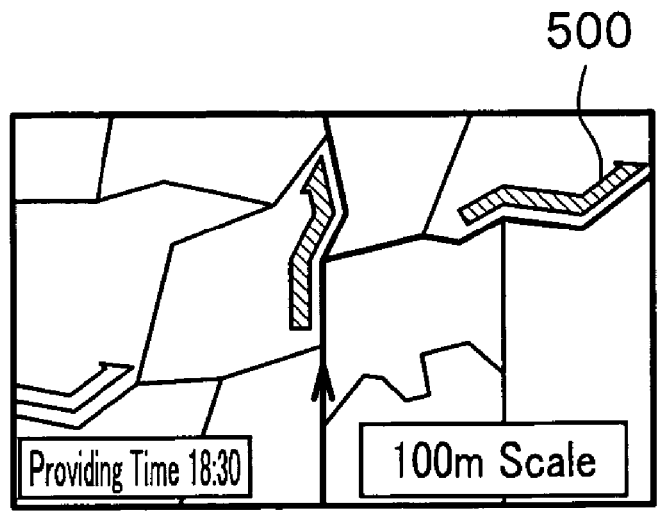
FIG. 12 is a display screen image example of traffic jam forecast information.
Figure 12B:
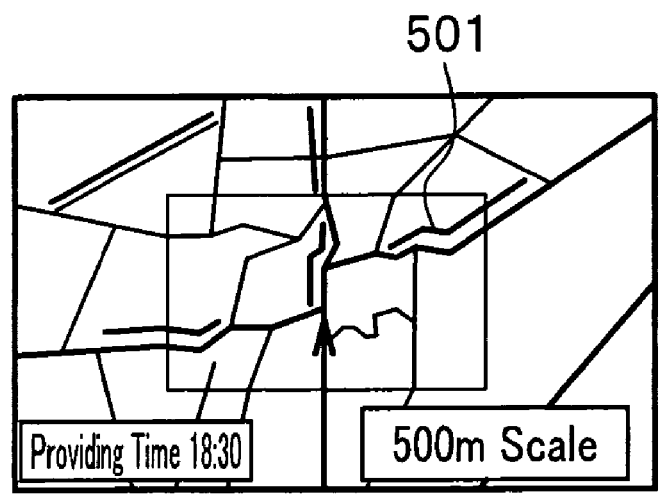

Next, FIGS. 12A and 12 B show the display examples of the traffic jam forecast information in a user's terminal and home PC. FIG. 12 A is an example of a case where a present traffic jam and a traffic jam trend are displayed in a hemmed arrow mark line 500. A length of the arrow mark line represents a traffic jam zone, a color inside the arrow mark line represents a traffic jam degree, and a hemmed color of the arrow mark line represents a traffic jam trend. For example, depict a color inside the arrow mark line in green in case of smooth, in yellow in case of crowded, and in red in case of traffic jam. In addition, if depicting the hemmed color of the arrow mark line in blue in case of a traffic jam diminishing trend and in violet in case of a traffic jam extending trend, data where a present crowded road is in an extending trend is displayed in the arrow mark line 500 whose center is yellow and is hemmed in violet. Thus, an arrow mark line 504 showing the diminishing trend of a traffic jam zone is drawn hemmed in blue; another arrow mark line 505 showing no increase/decrease trend of another traffic jam zone is drawn hemmed in white; and still another arrow mark line 506 showing the extending trend of still another traffic jam zone is drawn hemmed in violet. The embodiment selects whether or not to display the traffic jam forecast information according to the display scale of the map. For example, when a map is displayed in enlargement (detail) as shown in FIG. 12A, the arrow mark line 500 showing the traffic jam forecast information is displayed together with the traffic jam information; when a map is displayed in diminution (wide area) as shown in FIG. 12B, an arrow mark line 501 showing the traffic jam information is displayed overlapped on the map.

Figure 13A:
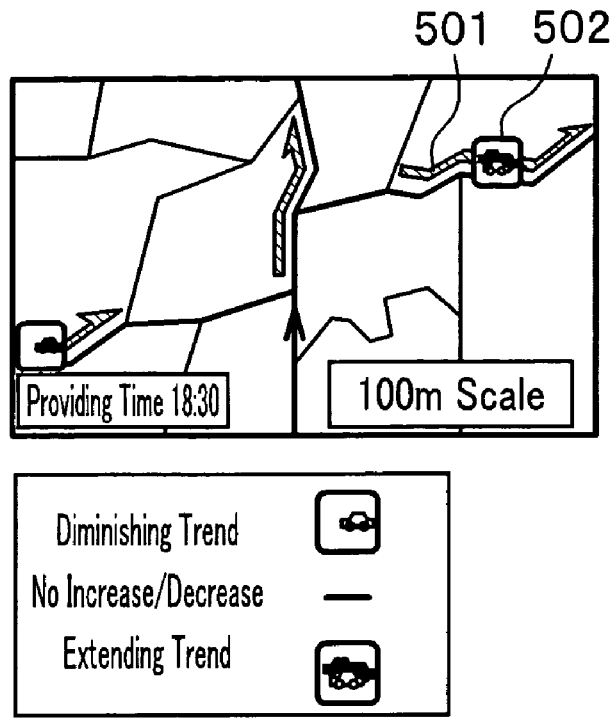
FIG. 13 is a display screen image example of traffic jam forecast information.

Although the example displays the traffic jam forecast information only when the map is displayed in enlargement, the information may be displayed using another display pattern described later according to the display scale of a map. FIG. 13A is an example of a case showing a present traffic jam situation and a traffic jam trend by an arrow mark line 501 and an icon 502. A length of the arrow mark line 501 represents a present traffic jam zone, a color of the arrow mark line 501 represents a traffic jam degree, and the icon 502 representing a traffic jam trend is displayed overlapped on the arrow mark line 501. Meanwhile, although the embodiment displays the icon 502 at an intermediate point of the traffic jam zone, the icon 502 may be displayed at the end of the traffic jam. Moreover, the icon 502 may be displayed at a plurality of places depending on a distance when the distance of a traffic jam zone is long and the like.

Figure 13B:
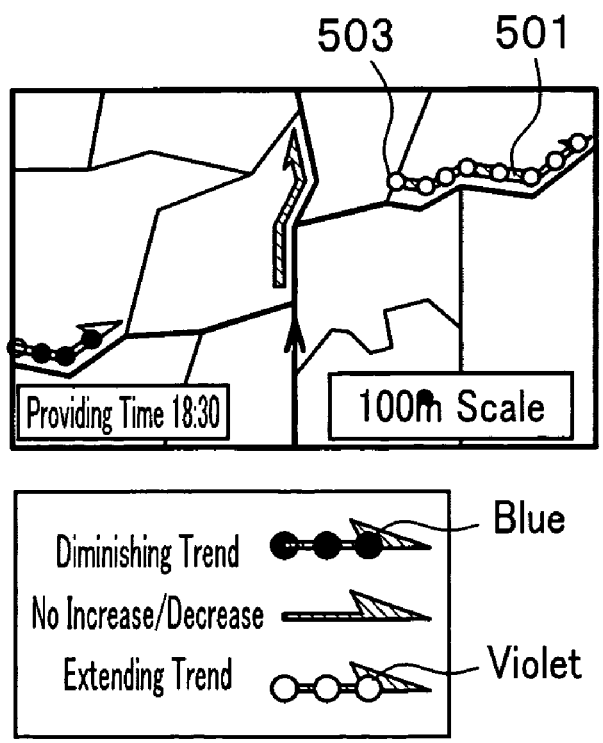

In FIG. 13B, a length of an arrow mark line 501 represents the present traffic jam zone, a color of the arrow mark line 501 represents the traffic jam degree, and another line pattern representing the traffic jam trend or a line 503 displaying icons at an equal distance is displayed. For example, when depicting colors of arrow mark lines in green in case of smooth, in yellow in case of crowded, and in red in case of traffic jam; and a traffic jam diminishing trend with a blue circle, and a traffic jam extending trend with a violet circle, violet circles 503 are displayed on the yellow arrow mark line 501 at an equal distance from the top of a traffic jam for data where a present crowded road is in the extending trend. Accordingly, blue circles are drawn side by side on an arrow mark line 507 where a traffic jam zone shows the diminishing trend; violet circles are drawn side by side on an arrow mark line 508 where a traffic jam zone shows the extending trend.

Other than these, it is acceptable to represent the traffic jam trend with a line width of the arrow mark line 501 and with a line style. For example, the followings are acceptable: to draw an arrow mark line with a bolder line than usual, when the traffic jam trend is in the extending trend; to draw an arrow mark line with a thinner line than usual, when the traffic jam trend is in the diminishing trend; to draw an arrow mark line with a double line, when the traffic jam trend is in the extending trend; and to draw an arrow mark line with a broken line, when the traffic jam trend is in the diminishing trend. In addition, same as in the traffic jam statistical information, a solid line and a broken line may be used as needed, depending on a reliability relating to the traffic jam forecast information.

Meanwhile, the maps of FIGS. 10A and 10B and the like may be a type of map that displays a periphery of a present point in enlargement (detail) and far from the present point in diminution (wide area), that is, a map displayed like a bird view and a map three-dimensionally displayed.

Thus, a user can easily grasp an intersection and road zone that are routinely and chronically jammed by displaying statistical traffic jam information on a map. In addition, he/she can also grasp a traffic jam frequent occurrence point and an average traffic jam degree in more detail by being provided with the traffic jam statistical information with respect to each season, weather, and road surface condition, or each Sunday/holiday/weekday and time zone. Moreover, the user can make a judgment reference showing what extent he/she can rely on provided information by the reliability of the traffic jam statistical information being added. Still moreover, by analyzing traffic jam increase/decrease trend information in the server whether a present traffic jam extends or diminishes hereafter and providing the information with the user, it becomes possible for him/her to easily judge whether or not to evade the traffic jam.

As described above, to display the statistical traffic jam information on a map enables a user to easily grasp an intersection and road zone that are routinely and chronically jammed.

What is claimed is:

1. A display method for a car navigation system which displays a position and proceeding direction of a user's car on a road map and displays a guide route on the road map, the display method overlappingly displaying a graphic at a position on the road map corresponding to traffic jam statistical information,
    wherein an area surrounded by said graphic depends on the traffic jam statistical information and a statistical reliability of the traffic jam statistical information,
    wherein said statistical reliability is a rank classification depending on an evaluation of a repeatability of the traffic jam information, based on a standard deviation of said traffic jam information
    wherein the standard deviation is obtained by;
        a first step of removing a day of data in advance as abnormal data when a predetermined time or more in the day indicate a traffic jam;
        a second step of removing data having a large deviation in advance as abnormal data when traffic jam information in a same time interval is compared for a plurality of days; and
        a step of calculating each standard deviation of the traffic jam statistical information at a predetermined location where the abnormal data is removed by the first and second step, and
    wherein said graphic has a perimeter that changes based on said statistical reliability.

2. A display method for a car navigation system according to claim 1, wherein the graphic is circular depending on the traffic jam statistical information, the method comprising the steps of:
    separating an inside of the circle into sectors depending on a time zone, and classifying and displaying colors of the sectors depending on one of a traffic jam occurrence frequency and average traffic jam degree in the traffic jam statistical information.

3. A display method for a car navigation system according to claim 1 wherein said graphic is selected from the group consisting of
    a solid line,
    a dotted line,
    a broken line, and
    a dashed line.

4. A display method for a car navigation system according to claim 1, wherein the predetermined point is an intersection.

5. A display method for a car navigation system according to claim 1, wherein the predetermined location is a road zone between intersections.

* * * * *